United States Patent [19]

Petersen

[11] Patent Number: 4,547,968
[45] Date of Patent: Oct. 22, 1985

[54] DESKTOP PLOTTER INSTRUMENT

[75] Inventor: David A. Petersen, Austin, Tex.

[73] Assignee: Bausch & Lomb Incorporated, Rochester, N.Y.

[21] Appl. No.: 608,647

[22] Filed: May 3, 1984

[51] Int. Cl.⁴ ............................................. B43L 13/00
[52] U.S. Cl. .................................. 33/32 R; 33/32 C; 33/32 F; 33/32 G
[58] Field of Search .................. 33/18 R, 32 R, 32 C, 33/32 D, 32 E, 32 F, 32 B, 32 G, 35, 19 A, 40

[56] References Cited

U.S. PATENT DOCUMENTS

| | | | |
|---|---|---|---|
| 1,537,393 | 5/1925 | Walsh | 33/32 E |
| 2,567,049 | 9/1951 | Belluche | 33/32 D |
| 3,665,609 | 5/1972 | Ganser | 33/32 C |
| 4,315,371 | 2/1982 | Kotani et al. | 33/32 C |
| 4,449,301 | 5/1984 | Backman | 33/32 E |

FOREIGN PATENT DOCUMENTS 1962858  7/1970  Fed. Rep. of Germany ..... 33/32 R

*Primary Examiner*—Willis Little
*Attorney, Agent, or Firm*—Bernard D. Bogdon

[57] ABSTRACT

A plotter instrument for marking on a recording medium utilizes a rotatable pen carousel carrying a plurality of marking pen elements. A carriage drives the pen carousel into engagement with a cam track to produce rotation of the pen carousel and result in a change of the marking pen element in position for marking on the recording medium. The plotter instrument further includes drive rollers on a first driven shaft and pinch rollers on a second shaft, which shafts extend between opposing end plates. The drive rollers and pinch rollers are engagable with the recording medium for providing displacement thereof. Relative positioning of the drive and pinch rollers is provided by a pinch roller shaft cap eccentrically placed on each end of the second shaft. Each shaft cap is of a multi-sided, regular polygon configuration and insertable in a respective end plate opening. The orientation at which the cap is inserted determines the relative spacing between the drive rollers and the pinch rollers.

16 Claims, 20 Drawing Figures

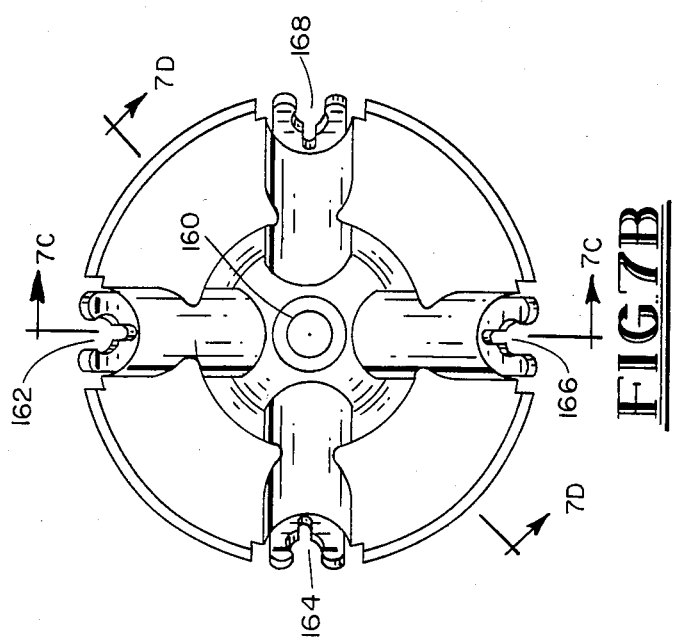
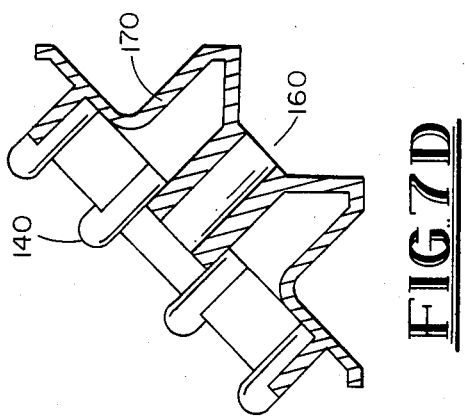
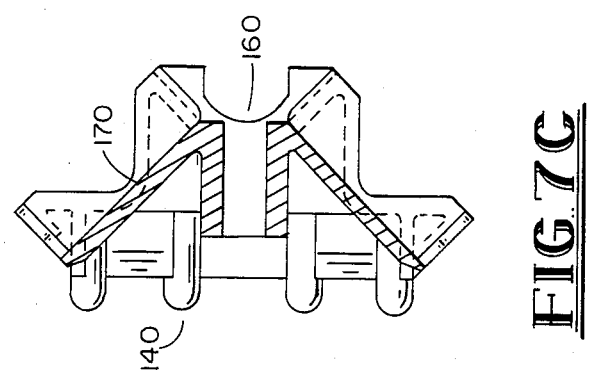
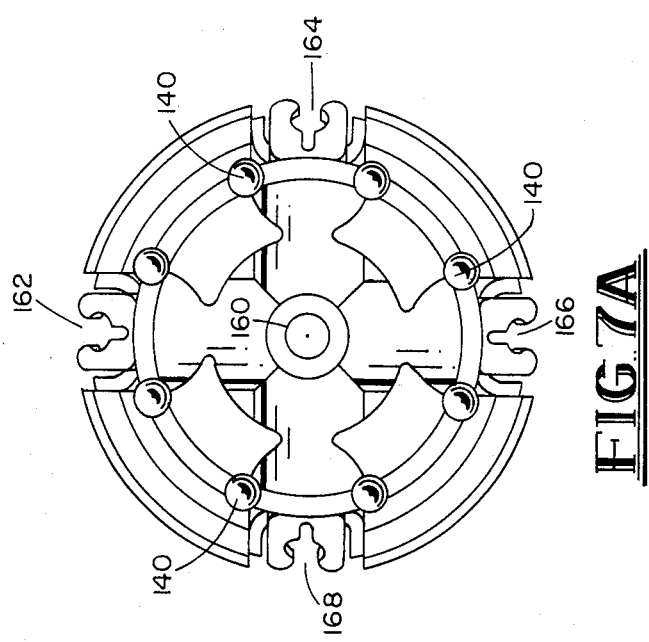

DESKTOP PLOTTER INSTRUMENT

FIELD OF THE INVENTION

The present invention relates to plotter instruments; and more particularly, it relates to a computer-driven plotter instrument for multicolor hard copy graphics.

BACKGROUND OF THE INVENTION

Personal computers for use at the home or office are becoming increasingly popular. Many applications for these computers require the capability to produce multicolor hard copy graphics. Further, a plotter instrument for providing this capability must be small, preferably desktop positionable, and low cost. These requirements have heretofore been satisfied by such plotter instruments as the HIPLOT ® DMP-29 and DMP-40 plotters offered by Baush & Lomb, Houston Instrument Division. However, these plotters do have certain limitations. For example, multicolor plotting with the DMP-40 requires that the computer program controlling the plotter include a "pause" command to allow pen changing. Although with the DMP-29, there is no need to manually stop the plotter to change pens, there is an increased cost.

Accordingly, there is the need for a low cost, desktop plotter instrument for multicolor plotting under computer control without need of "pause" commands to manually stop operation for pen changing.

SUMMARY OF THE INVENTION

The present invention provides a compact desktop plotter instrument for multicolor plotting under computer control. The plotter takes data supplied by a computer in accordance with a program of instructions to plot maps, formulas, graphs, script, block letters, drawings, geometric patterns and charts on plotting media comprising ordinary bond paper, drafting vellum, acetate and mylar.

In accordance with the present invention, a plotter instrument has a platen defining a supporting surface for a sheet plotting medium and a traveling carriage bidirectionally movable across the platen in the x-direction. A drive roller and pinch roller mechanisms engage the plotting medium to provide bidirectional displacement thereof across the platen in the y-direction. A pen carousel carrying a plurality of marking pen elements, each of which may be of a different color, is mounted to the carriage for travel wherewith. The pen carousel is rotatable to permit placement of any one of the pen elements in position for marking on the plotting medium. A mechanism is further provided to cause rotation of the pen carousel, thereby placing a different pen element in position for marking. The carousel is locked in a desired position by a detent mechanism.

Further in accordance with the present invention, the mechanism for causing rotation of the pen carousel includes a cam track disposed along the line of carriage travel and a cam follower on the pen carousel. The carriage drives the pen carousel to cause engagement of the cam follower with the cam track, thereby rotating the carousel and resulting in a pen change.

Preferably, the cam track includes an upwardly arcing concave track surface and an adjacent convex track surface. The cam follower first engages the concave cam track surface as the carriage is driven in one direction, to begin rotation of the pen carousel. The cam follower subsequently engages the convex cam track surface as the carriage is driven in the opposite direction, to complete rotation of the carousel and a pen change.

The pen carousel may also carry indicia thereon serving to provide a position reference. A sensor responsive to the indicia on the carousel provides a signal indicating the rotational position of the carousel. Preferably, the indicia is a light reflective surface, and the sensor is an optical sensor and light source.

In accordance with yet another aspect of the present invention, the pinch roller mechanism includes a shaft extending between opposing end plates. A shaft cap is eccentrically placed on each end of the shaft. Each cap is of a multi-sided polygon configuration and is insertable in a substantially rectangular opening in a respective end plate. The orientation at which the cap is inserted determines the spacing of the pinch rollers relative to the drive rollers, which in turn establishes the pressure of engagement therebetween.

BRIEF DESCRIPTION OF THE DRAWINGS

The written description setting forth the best mode presently known for carrying out the present invention, and of the manner of implementing and using it, is provided by the following detailed description of a preferred embodiment which is illustrated in the attached drawings wherein:

FIGS. 7A and 7B are front and back views, respectively, of the pen carousel;

FIGS. 7C and 7D are cross-sectional views of the pen carousel along the section axis indicated in FIG. 7B;

DETAILED DESCRIPTION OF A PREFERRED EMBODIMENT

A. Electromechanical Components of Plotter

Figure 1:
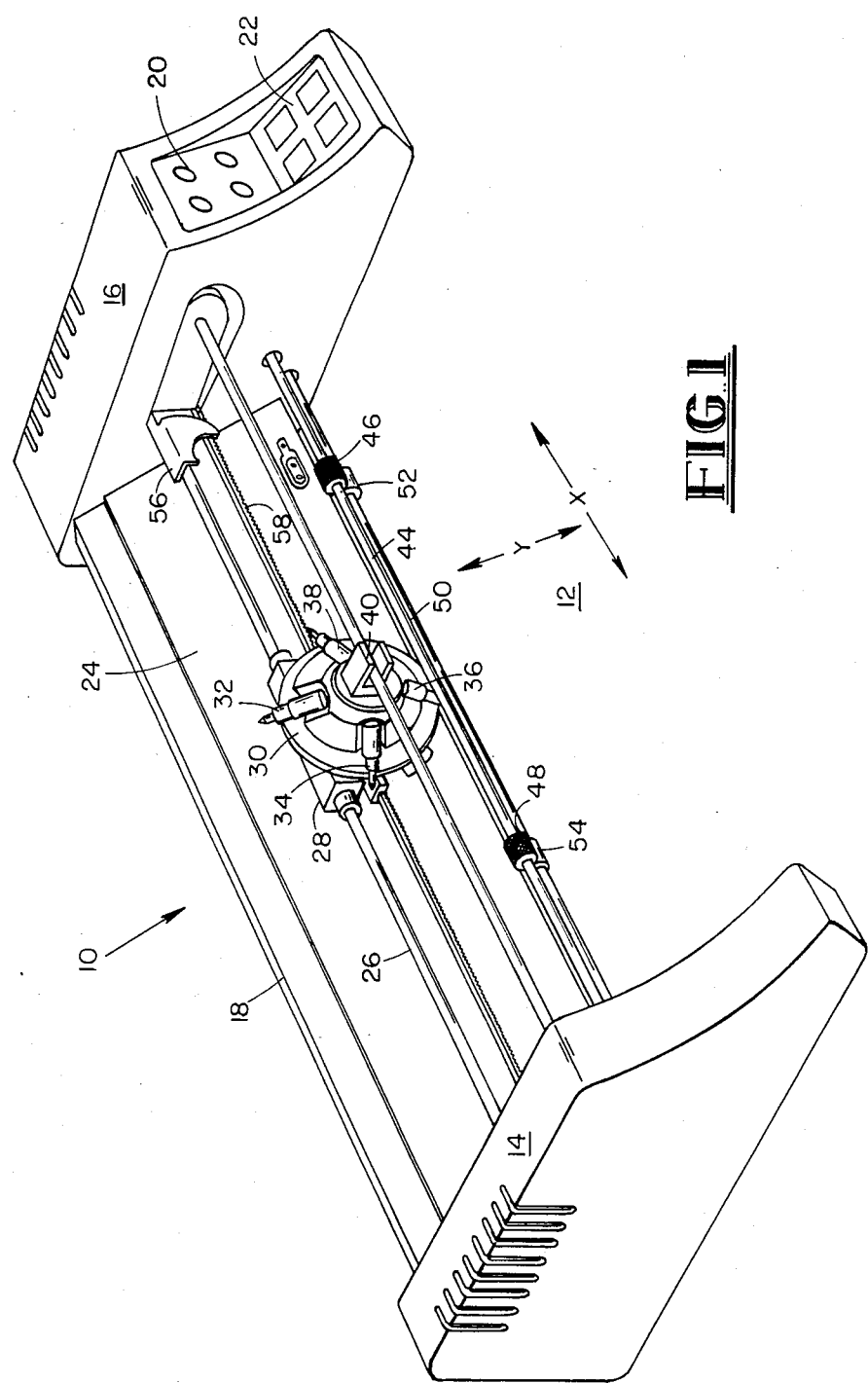
FIG. 1 is a perspective view of a plotter instrument according to the present invention.

Referring first to FIG. 1, there is shown in perspective view plotter instrument 10 in accordance with the present invention. The plotter is adapted to be set upon a level horizontal surface 12, such as a desktop. The plotter instrument rests on footings (not shown) contained in housing covers 14 and 16. The complete housing includes a back panel cover 18. Housing end 16 includes several wells 20 for holding various marking pen elements and a keyboard 22 for selecting various modes of plotter operation.

Extending between end housings 14 and 16 is platen 24. The platen defines a supporting surface for a sheet plotting medium. A guide 26 extends from side-to-side above the platen in the X-direction. A traveling carriage 28 is mounted on guide 26 for bidirectional movement thereon. A rotatable pen carousel 30 carrying marking pen elements 32, 34, 36, and 38 is mounted on carriage 28 for travel therewith. Pen carousel 30 is rotatable to permit placement of any one of the marking pen elements in position for marking on the plotting medium. In FIG. 1, pen 36 is shown in position for marking. Pen carousel 30 is rotated to place a desired pen element in position for marking based on a reference indicator on the carousel.

Carriage 28 is pivotally mounted on guide 26. Accordingly, pen carousel 30 can be vertically pivoted to raise pen 36 off the plotting medium. Raising and lowering of the pen carousel is provided by a pen lifting mechanism which includes a guide 40 attached to the front of pen carousel 30 and a lifting bar 42.

A motor driven shaft 44 carries drive rollers 46 and 48 thereon. Each drive roller is coated with a grit material comprised of 95% powdered stainless steel, 2½% powdered nylon, and 2½% powered polyester. The coating is applied by a conventional plasma spray process known in the art. A pinch roller shaft 50 having pinch rollers 52 and 54 mounted thereon is further provided. The drive rollers and pinch rollers engage with the plotting medium to provide bidirectional displacement of the medium across the platen in Y-direction.

Changing between the marking pen elements to place a different one of the pens in position for marking on the plotting medium is accomplished by directing the carriage to drive the pen carousel toward a cam track 56. Carriage 28 is driven by a motorized, toothed drive belt 58. When driven to the cam track, pen carousel 30 rotates. Optical sensing means 60 mounted beneath platen 24 senses indicia on pen carousel 30 to reference the rotational positioning of one marking pen element in the pen carousel.

Figure 2:
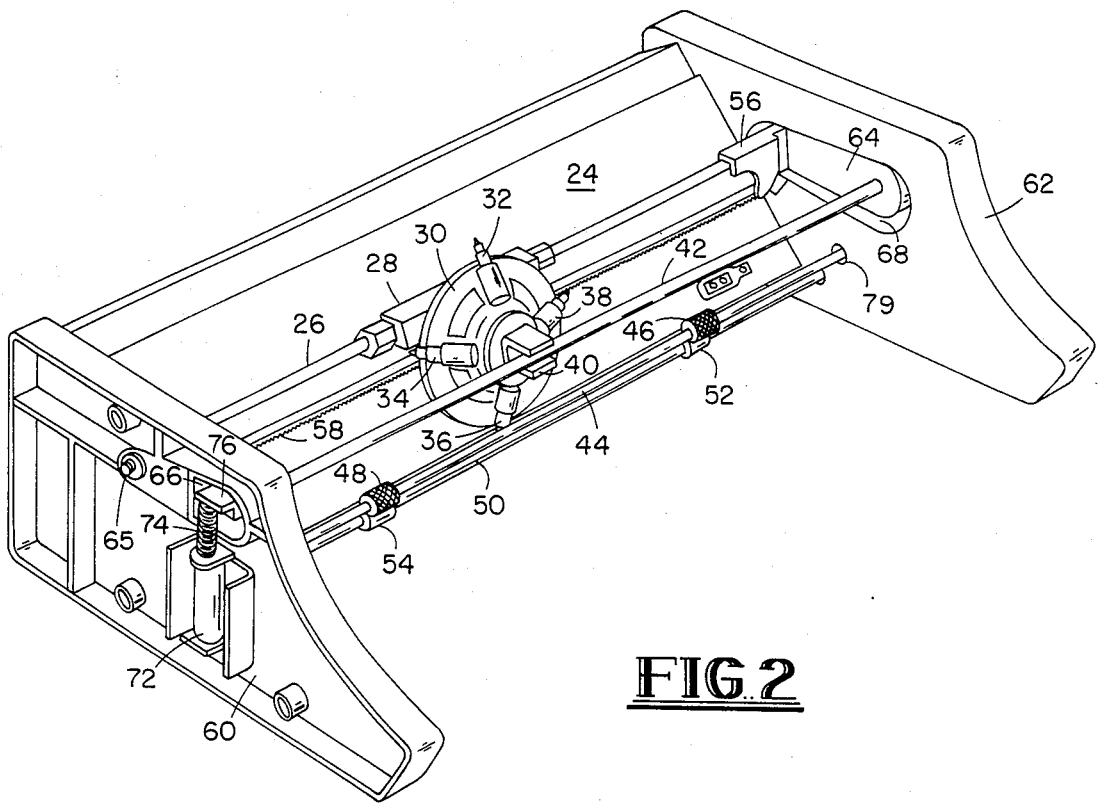
FIG. 2 is a left end perspective view of the plotter instrument with the housing removed.
Figure 3:
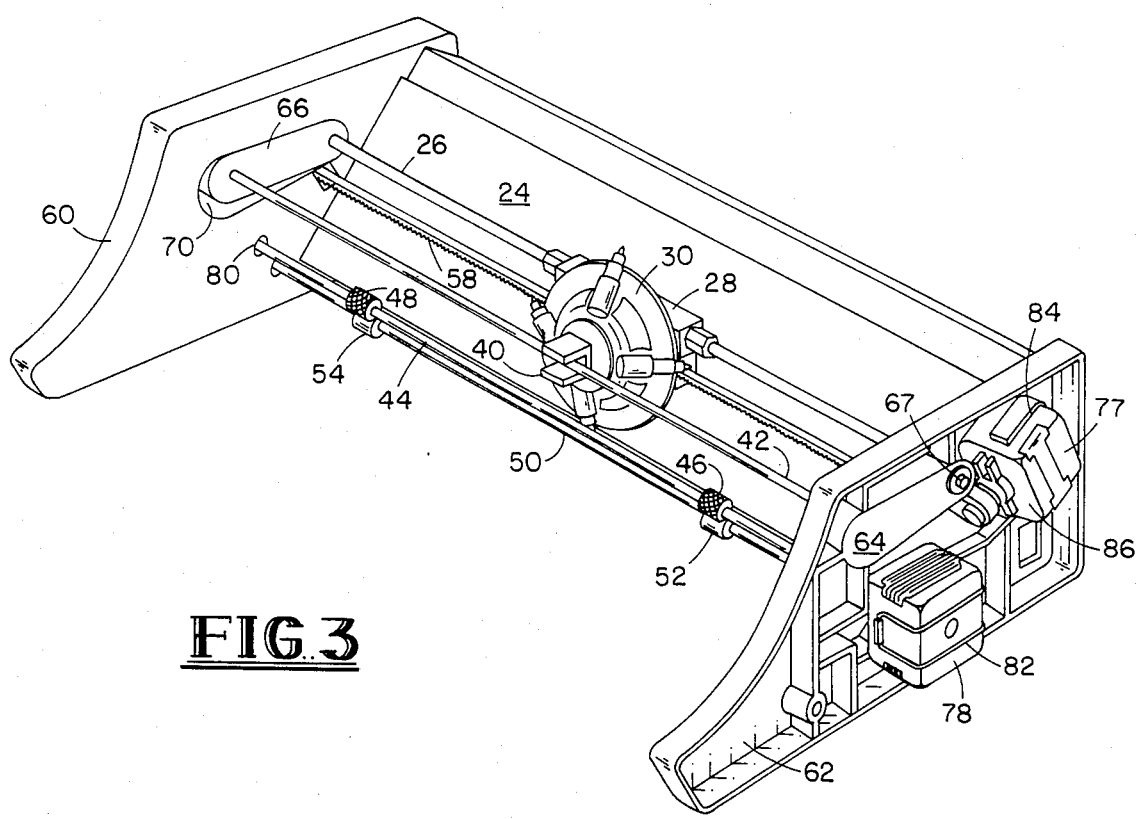
FIG. 3 is a right end perspective view of the plotter instrument with the housing removed.

With the foregoing general description of the plotter instrument, reference is now directed to FIGS. 2 and 3. In both FIG. 2 and FIG. 3, end housings 14 and 16 are removed to reveal the structure of end plates 60 and 62 and components mounted thereon. In FIG. 2, end plate 60 is in view and reveals the pen lift mechanism. As shown, lifting bar 42 is connected at its ends to links 64 and 66. Each link is pivoted at its respective link pivot 65, 67 and is disposed within a respective opening 68 and 70.

Pivotal movement of link 64, 66 to effect movement of lifting bar 42 is produced by activation of solenoid 72 mounted to end plate 60. Solenoid 72 includes bias spring 74 disposed about the plunger. Further, the plunger of solenoid 72 engages bracket 76 connected to pivotal link 66. In the non-energized state, spring 74 biases the solenoid plunger to its upwardly extended position, which causes lifting bar 42 to be in the raised position. This, of course, causes pen 36 in the marking position on carousel 30 to be raised from the surface of a sheet of plotting medium. Upon energization of solenoid 72, the plunger is pulled down against the tension of spring 74. The pivot links and lifting bar are thereby released and gravity force urges pen 36 against the surface of the plotting medium for marking. In addition to, or in lieu of, gravity, a spring and dashpot structure could be utilized.

As shown in FIG. 3, end plate 60 has carriage drive motor 77 and drive roller motor 78 mounted thereto. Preferably, drive roller shaft 44 is an extension of the armature shaft of motor 78; and therefore, extends through opening 79 (see FIG. 2) of end plate 62. The end of shaft 44 positioned away from motor 78 is preferably mounted in a bearing 80 disposed in end plate 60. Motor 78 is retained in position on end plate 62 by a spring clip 82. Motor 76 is similarly mounted with a spring clip 84. Adjustment of the tension on carriage drive belt 58 is provided by means of screw 86.

Figure 4:
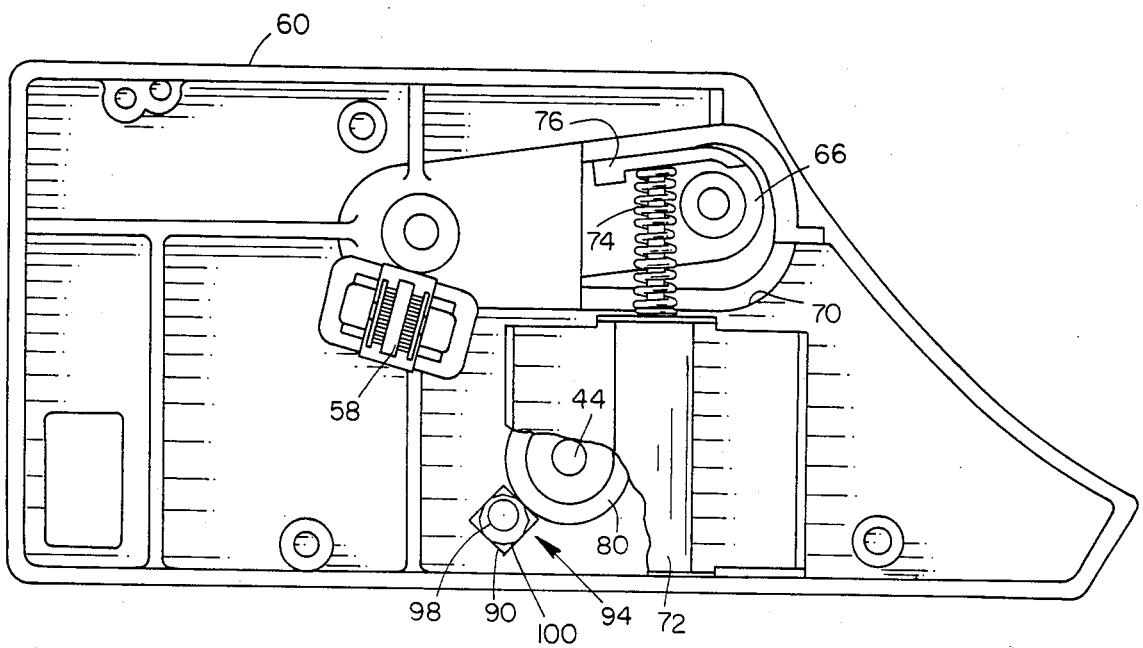
FIG. 4 is a view in elevation of the left end plate of the plotter instrument of FIG. 1.
Figure 5:
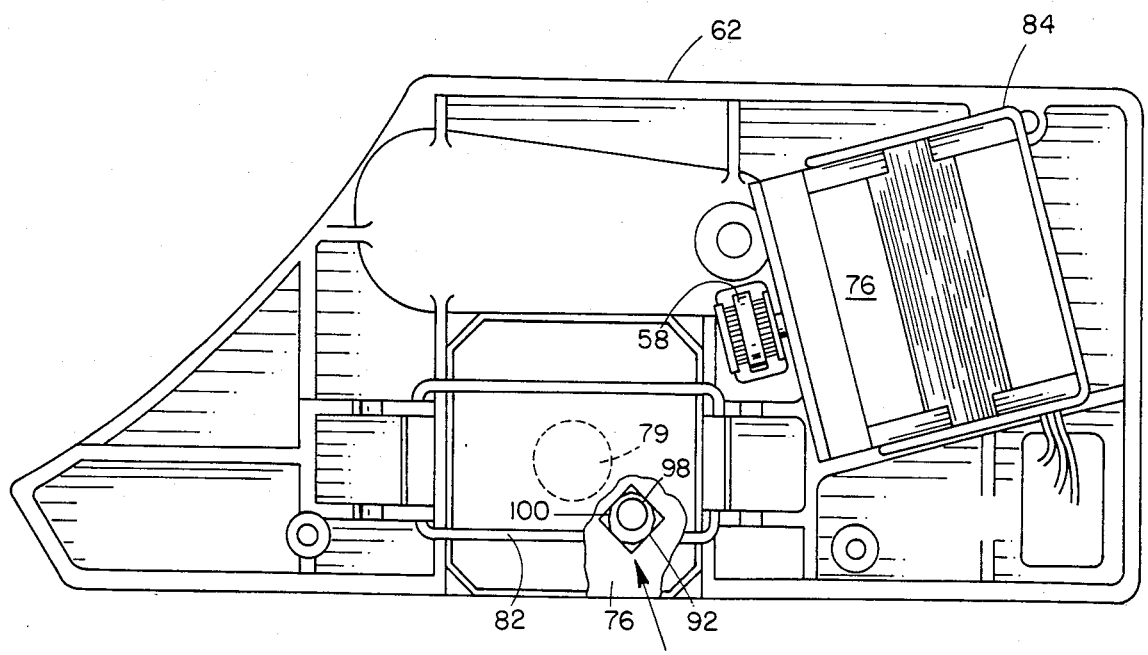
FIG. 5 is a view in elevation of the right end plate of the plotter instrument of FIG. 1.

Referring now to FIGS. 4 and 5, there is presented close-up views of end plates 60 and 62, respectively. In view in FIG. 4 by reason of the partial cut away of the solenoid mount is bearing 80 for drive roller shaft 44. In FIG. 5, the opening 79 in end plate 62 is shown in dotted outline. As was described in connection with FIGS. 1-3, pinch rollers 52 and 54 are carried on pinch roller shaft 50 which extends between end plates 60 and 62. Therefore, shown in FIG. 4 is an opening 90 in end plate 60. Correspondingly, shown in dotted outline in FIG. 5 is an opening 92 in end plate 62. Openings 90 and 92 are provided to receive pinch roller shaft end caps which serve as supports.

Figure 9A:
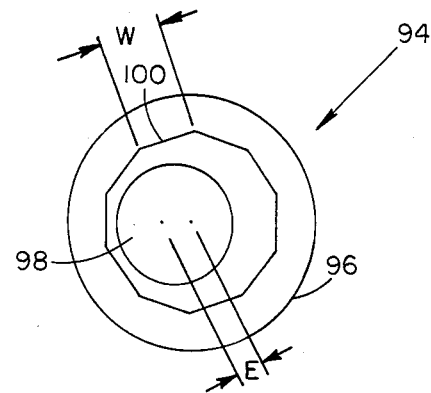
FIGS. 9A, 9B, and 9C are front, side, and rear views, respectively, of the wheel shaft cap used on the pinch roller shaft.
Figure 9B:
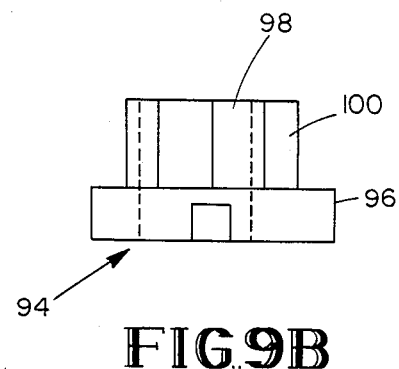
Figure 9C:
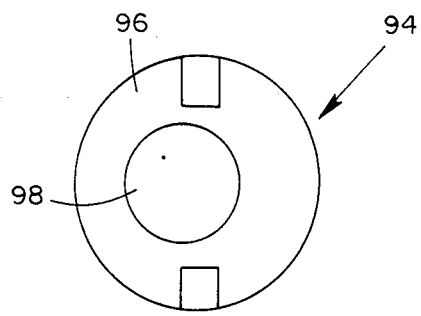

Referring to FIGS. 9A-9C, a representative one of the pinch roller shaft end caps 94 is shown. Cap 94 includes a flange portion 96 and multi-sided regular polygon extension 100. A circular opening 98 having its center point axis offset with respect to the center line axis of polygon extension 100. Therefore, extension 100 is eccentrically positioned on the end of the pinch roller shaft. The dimensions of the polygon extension are such that it is insertable in a respective end plate opening 90 or 92. It will be appreciated that the orientation at which the cap extension is inserted determines the relative spacing between drive rollers 48, 46 and pinch rollers 52, 54. This, of course, establishes the pressure of engagement between the drive and pinch rollers. To also be noted is that the degree of eccentricity E of opening 98 to extension 100 is a function of the width W of the flat sides of the polygon. The relationship can be expressed as E ½W. Therefore, for a different number of sides, the eccentricity changes. The diameter of the polygon extension is also a factor in the W dimension.

Figure 6:
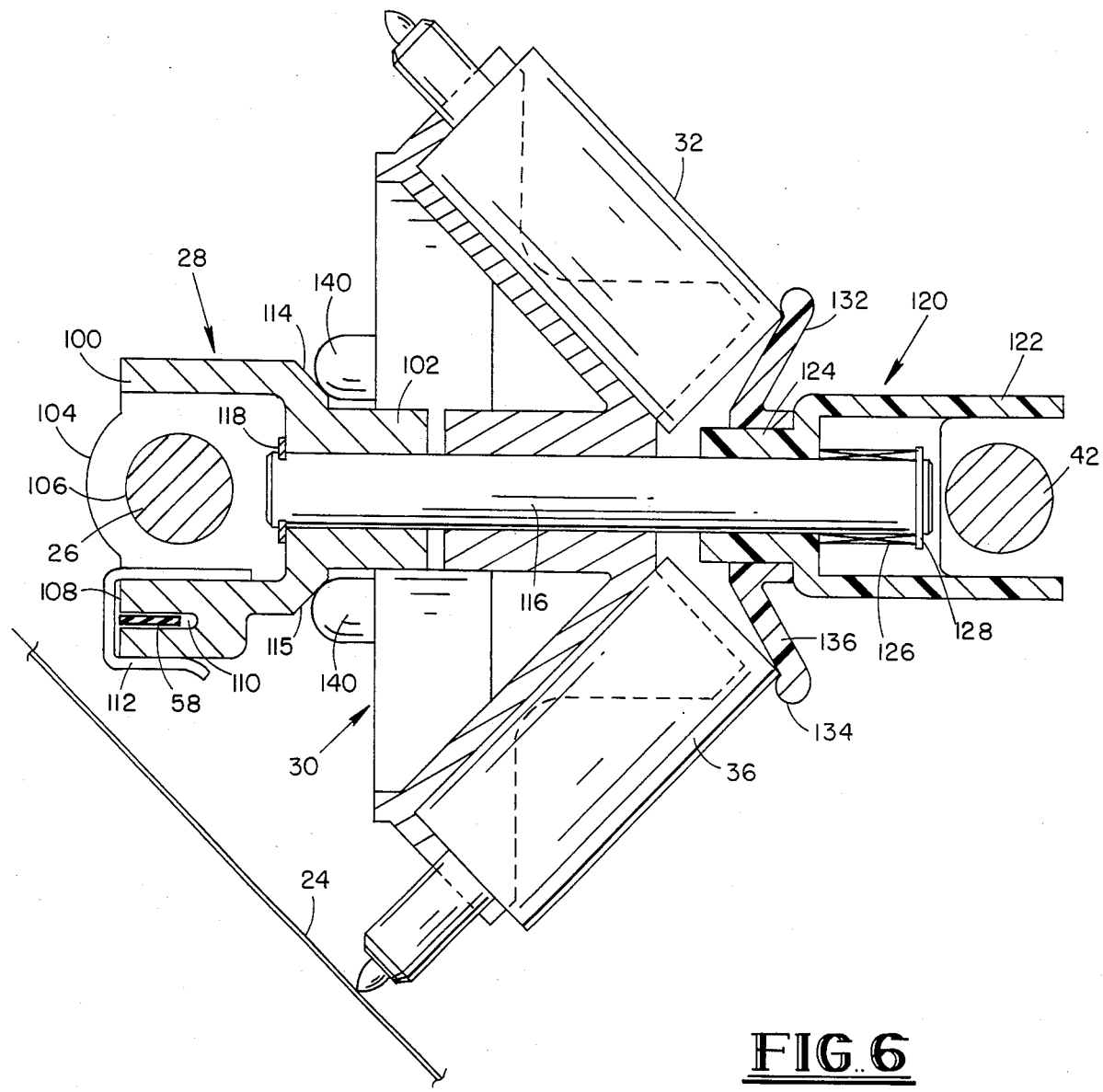
FIG. 6 is a section view of the pen carriage and pen carousel used in the plotter instrument of FIG. 1.

Referring next to FIG. 6, there is presented a cross-sectional view of the traveling carriage 28 and carousel 30 assembly. As shown, traveling carriage 28 includes a housing portion 100 having a boss 102. The housing further includes end walls 104 having a journal opening 106 therein for receiving guide rod 26. Housing 100 has an interior opening between the end walls and adjacent boss 102, which defines a lower lip portion 108. Within lip portion 108 is an open notch 110 for receiving endless drive belt 58. To retain belt 58 in position, a spring clip 112 is placed on lip 108 to close the opening to notch 110. The exterior surface configuration of housing 100 includes upper and lower beveled surfaces 114, 115. The functions of these double surfaces will be discussed below.

Inserted within boss 102 of traveling carriage housing 100 is rod 116. A snap ring 118 retains rod 116. Pen carousel 30 is placed on rod 116 for rotation thereon. Further, pen carousel 30 is axially movable along rod 116. Also placed on rod 116 and axially movable thereon is guide 120. Guide 120 has a generally rectangular housing 122 and integral boss extension 124. The end of shaft 116 which extends through boss 124 carries a spring 126 and retainer ring 128. Spring 126 services to bias carousel 30 forwardly toward carriage 28 and it also bias the button structure 132 against the marking pen elements. The button structure 132 includes a lip 134 extending about its periphery. The lip and a resilient arm portion 136 afford a snap-in retaining mechanism for the marking elements.

Figure 8A:
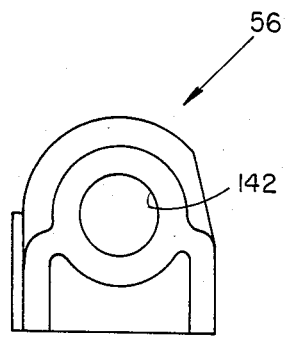
FIGS. 8A, 8B, and 8C are left side, front, and right side views, respectively, of the cam track used in the plotter instrument.
Figure 8B:
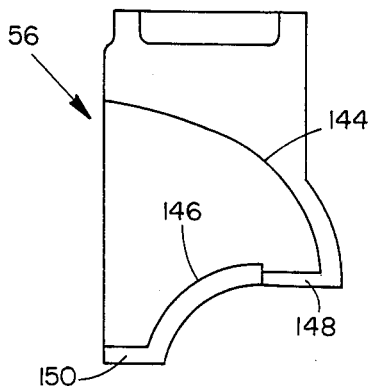
Figure 8C:
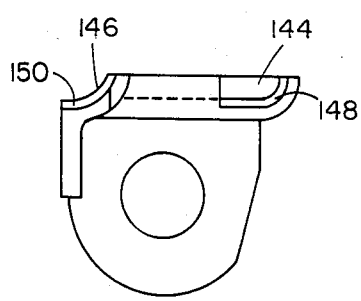

Pen carousel 30 further includes a plurality of cam followers 140. The cam followers normally engage beveled surfaces 114, 115 on carriage 28. Surfaces 114, 115 provide a detent to restrain rotational movement of pen carousel 30. However, when it is desired to rotate pen carousel 30 to place a different one of the marking pen elements in position for marking on the plotting medium, carriage 28 is driven so as to cause a cam follower to engage cam track 56. Referring to FIGS. 8A–8C, there are shown three views of cam track 56. FIG. 8A illustrates the side of cam track 56 which is adjacent end plate 62, and it further shows bore opening 142 for receiving therethrough guide rod 26. FIG. 8B shows a frontal view of cam track 56. In this view, cam track 56 is shown to include a concave cam track portion 144 and a convex cam track portion 146. Continuing to FIG. 8C, cam track 56 is shown from the opposite side and illustrates the beveled surface 148 at the entry to cam track portion 144 and the beveled surface portion 150 at the exit of cam track portion 146.

Considering FIG. 6 together with FIG. 8, in a pen changing operation, traveling carriage 28 is driven toward the location of cam track 56. A cam follower on the pen carousel engages the beveled surface 148 of cam track 144. This engagement causes pen carousel 30 and guide 120 to be urged backwardly against spring 126. Also, the detent stop established between beveled surfaces 114, 115 and the cam followers 140 engaged therewith is broken. With the detent stop broken, pen carousel 30 is free to rotate about rod 116. As traveling carriage 28 continues to be driven, the cam follower which engages cam track 56 follows the upwardly arcing concave surface of cam track portion 144. This, of course, begins rotation of the pen carousel. Next, traveling carriage 28 is driven in the reverse direction. The cam follower then engages the concave cam track portion 146, to continue and complete rotation of the pen carousel. As the cam follower engaging cam track 56 proceeds past beveled surface 150, spring 126 is permitted to return guide 120 and pen carousel 30 to its normally biased location. This, of course, causes the cam followers adjacent surfaces 114, 115 to engage those surfaces and re-establish the detent stop and prevent carousel rotation. This, too, results in a change of the marking pen element in position for marking on the recording medium.

In FIGS. 7A–7D, the construction of pen carousel 30 is presented in greater detail. FIG. 7A presents a frontal view of the pen carousel, and FIG. 7B presents a rear view of the carousel. FIGS. 7C and 7D present cross-sectional views of the pen carousel along the section lines shown in FIG. 7B. The frontal view of FIG. 7A shows the plurality of cam followers 140, which are spaced equal distance apart about the axis 160 of carousel rotation. Further shown in the frontal view of FIG. 7A and also shown in the rear view of FIG. 7B are pen marking element snap-in retainers 162, 164, 166, and 168. As best shown in FIG. 7, pen carousel 30 has a central structure 170 for supporting the marking pen elements. This structure is generally configured as a truncated cone, so as to dispose the marking pen elements at an orientation complementary to the angle of inclination of platen 24 (see FIG. 6). Preferably, the platen is disposed at an angle of 45° with respect to horizontal. Therefore, the pen carousel structure 170 carries the marking pen elements at an angle of 45° with respect to its axis of rotation 160. The particular angles of inclination are not critical. The aspect of importance is that of the relationship of the centerline of the conical structure 170 to the surface supporting the plotter. Preferably, the centerline is parallel to the support surface.

Figure 10:
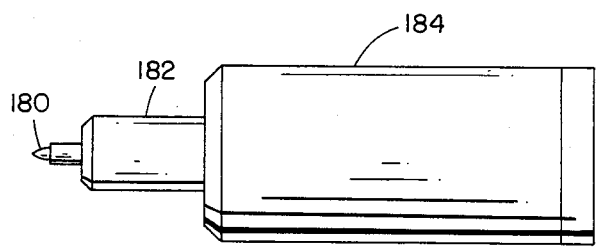
FIG. 10 is a side view of the marking pen element used in the pen carousel of the plotter instrument.

In FIG. 10, a representative one of the marking pen elements is shown. Preferably, the marking pen element has a hard fiber tip 180. The pen further includes a neck portion 182 to be received within the snap-in retainer (e.g., 162) of the pen carousel. Although the body portion 184 may be of any configuration, a cylindrical configuration is preferred. The actual dimensions in terms of length and diameter of body 184 are, of course, chosen so as to fit into the conical portion 170 of pen carousel 30 (see FIG. 6).

B. Electronic Circuitry of Plotter

Figure 11A:
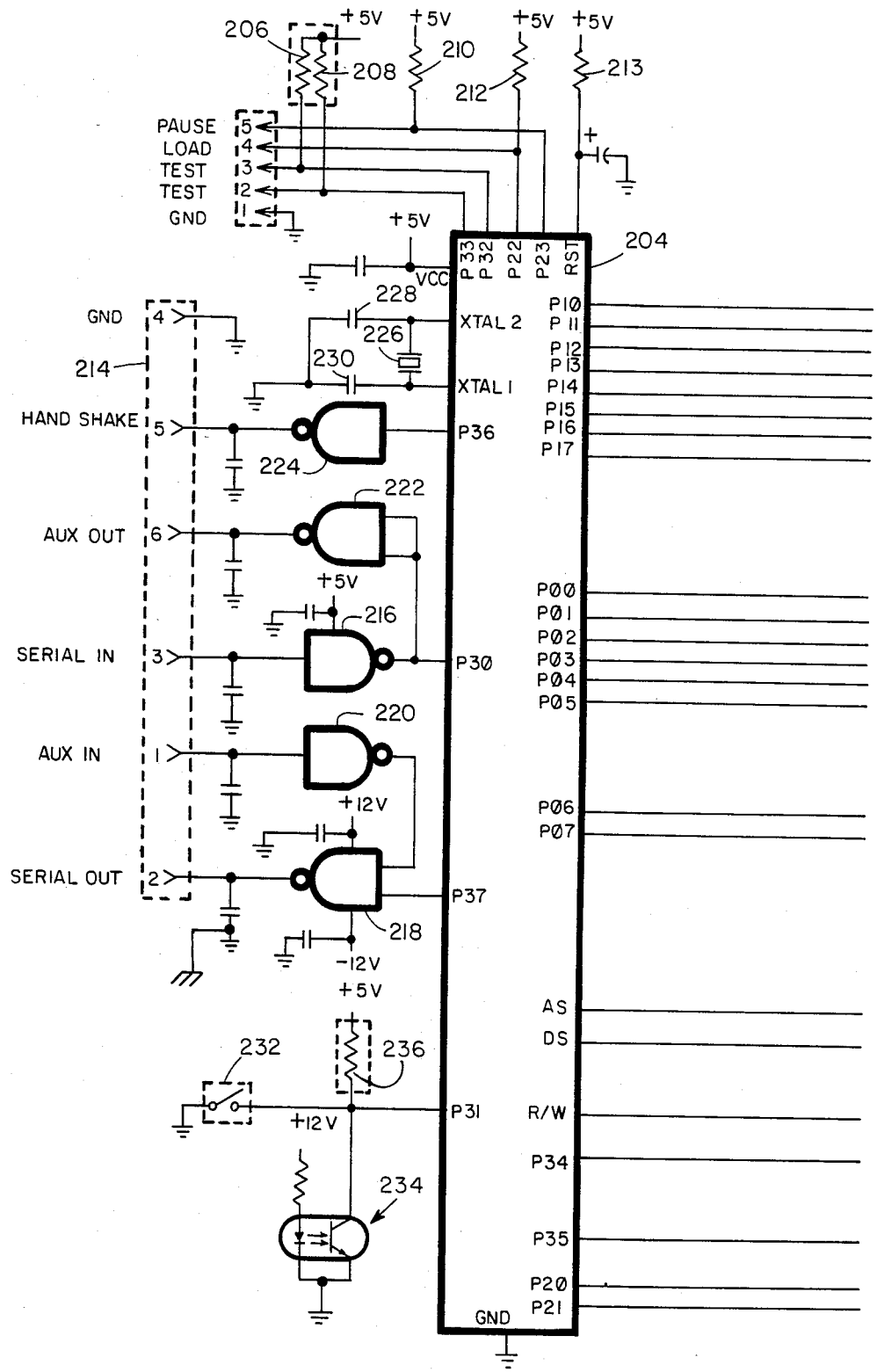
FIGS. 11A, 11B, and 12 are schematic diagrams of the electronic circuitry for receiving computer commands and controlling the electromechanical components of the plotter instrument.
Figure 11B:
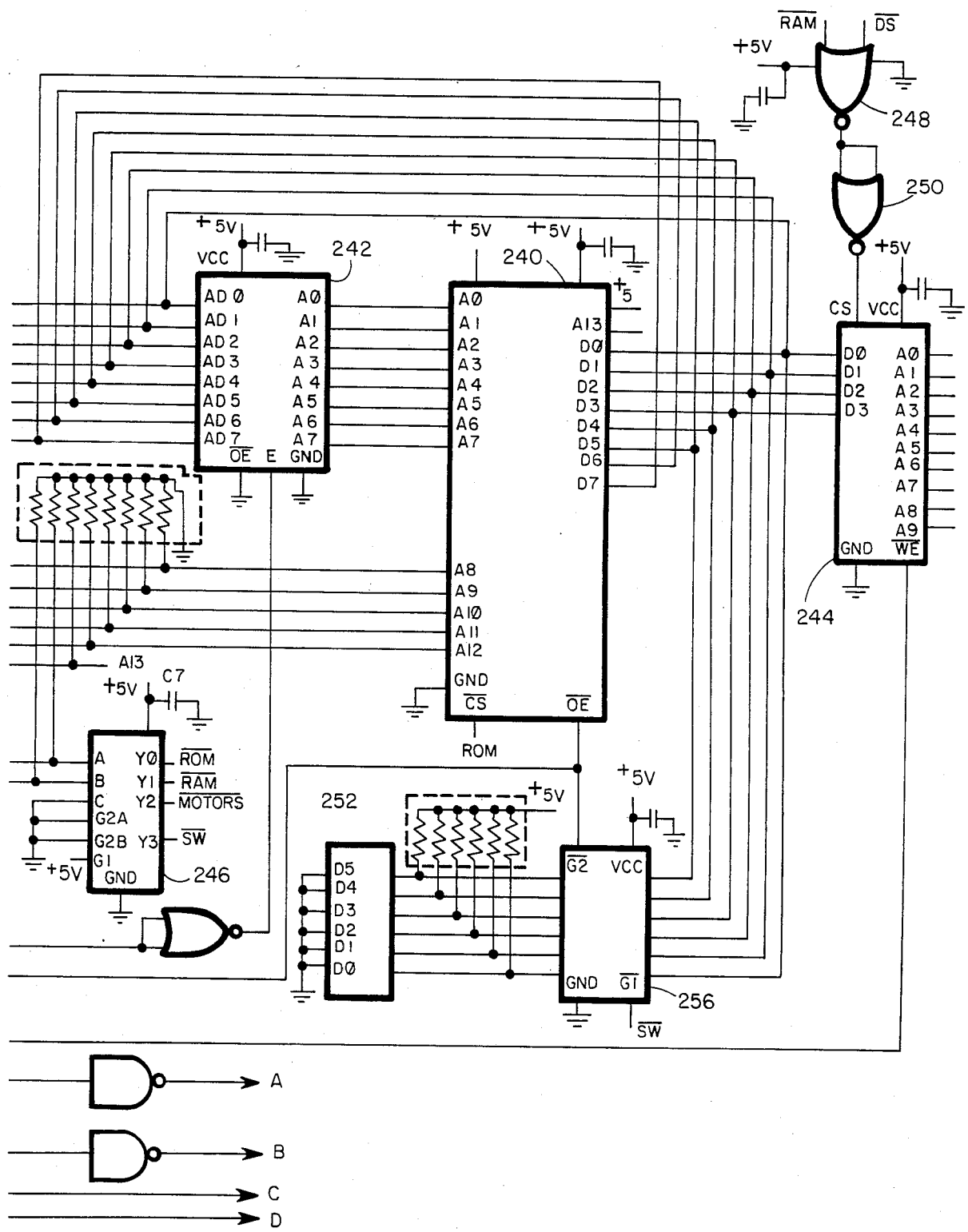

Referring now to FIGS. 11A and 11B, there is shown a schematic diagram of circuitry for receiving computer commands and directing in response thereto the operation of the various mechanical components of the plotter instrument. In FIG. 11A, front panel keyboard commands are input to the electronics through a connector 202. The keyboard command signals are applied as inputs to a microprocessor 204 (28681). Each of the input lines has a 10K pull-up resistor connected thereto. These resistors are designated by reference numerals 206, 208, 210, and 212.

Another connector indicated by the reference numeral 214 provides the points of connection for the serial data interface, which is a conventional RS232 interface. Serial input data is applied to microprocessor 204 through line receiver 216. Serial output data from microprocessor 204 is made available by line driver 218. Additionally, auxiliary input and output data are handled through gates 220 and 222, respectively. Gate 224 provides a "hand shake" output signal to the host computer.

Timing for the microprocessor is provided by a 49152 MHz crystal oscillator including crystal 226 and external 10 pf capacitors 228 and 230.

Another input to microprocessor 204 is from circuitry including limit switch 232 and optical sensor 234 (OPB 708). Limit switch 232 is closed when traveling carriage 28 is driven into position adjacent cam track 56. Optical sensor 234 implements the optical sensing means 60 for sensing indicia on pen carousel 30 to reference the rotational positioning of one marking pen element in the pen carousel. As will be appreciated, limit switch 232 and optical sensor 234 are connected together in a "wired-or" logic arrangement along with 10K pull-up resistor 236. It is only when limit switch 232 is closed and reference indicia on pen carousel 30 is sensed by optical sensor 234 that node 238 is pulled "low". This "low" condition is an input to microprocessor 204.

Referring now to FIG. 11B, the program for directing the operation of the plotter components in response to host computer commands resides in read only memory (ROM) 240 (2764 and 2712B). A portion of the address to ROM 240 is provided by demultiplexor 242 (LS373).

Also included in the circuitry is random access memory (RAM) 244 (2114L). Selection between ROM 240 and RAM 244 is by decoder 246 (74HCT138) and gates 248, 250 (LS02).

DIP switch 252 in combination with 10K pull-up resistors 254 provide a code which is entered into latch 256 (L5365). The data in latch 256 is accessed by the microprocessor in the same manner as a memory. The code set in DIP switch 252 relates to communication parameters for the RS232 interface. These parameters include baud rate and a parity bit.

Figure 12:
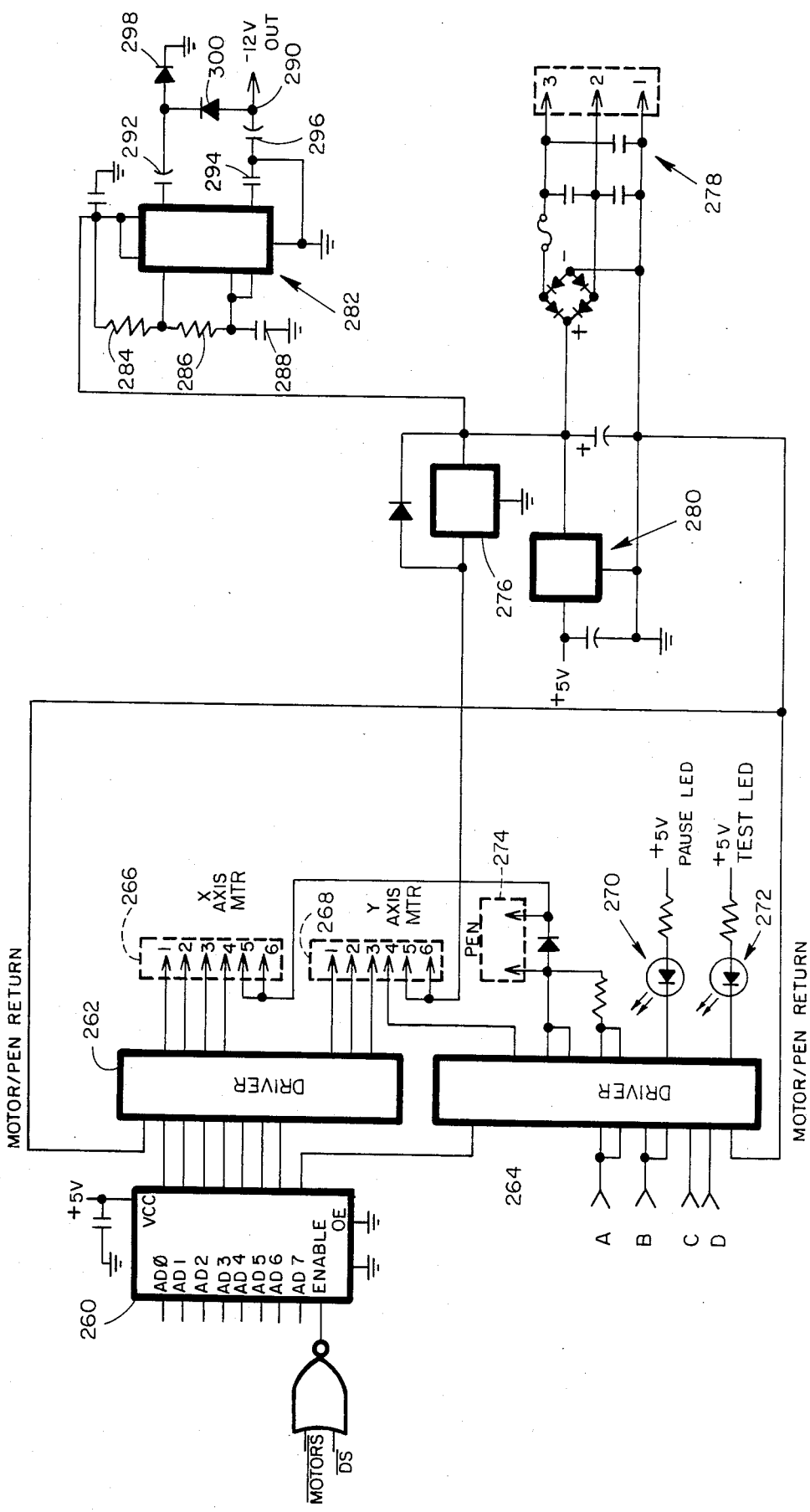

Referring now to FIG. 12, motor control data from RAM 244 in FIG. 11B is entered into latch 260 (LS373). The data is applied to drivers 262 and 264. These devices are suitably Darlington transistor packs (ULN20-03A). Outputs from drivers 262 and 264 are routed to the X-axis stepping motor through connector 266. Similarly, signals for driving the Y-axis stepping motor are routed through connector 268.

Referring briefly again to FIGS. 11A and 11B, additional command signals from microprocessor 204 are applied to driver 264. These signals control PAUSE indicator 270, which comprises a light-emitting diode and a 330 ohm series resistor. Additionally, a microprocessor output signal controls a TEST indicator 272, which similarly comprises a light-emitting diode and a 330 ohm series resistor.

The remaining two microprocessor outputs to driver 264 control the pen lift solenoid 72 shown in FIGS. 2 and 4. The connection to solenoid 72 is through connector 274 in FIG. 12.

As shown in FIG. 12, +12 volts power for the stepping motors and the pen lift solenoid is provided by regulator circuit 276 (LM340T-12). The output of regulator 276 is applied through connectors 266, 268, and 274.

Electrical power for the circuitry and electromechanical components is obtained from a power supply generally designated by reference numeral 278. The +12 volts regulator 276 is connected to the output of power supply 278. Additionally, a +5 volts regulator 280 (LM340T-5) is connected to the output of power supply 278.

To provide the −12 volts for line driver 218 in FIG. 11A, a level shifter circuit generally designated by reference numeral 282 is used. The device is a timer circuit (LM555) and associated timing components including resistors 284(1K) and 286(33K), and capacitor 288(0.01 uf). The −12 volts output is obtained from terminal 290 of a network connected to the timing circuit device. This network includes capacitors 292(47 uf), 294(0.01 uf), and 296(47 uf) in combination with diodes 298 and 300 (IN4005).

C. ROM 240 Program Listing

```
00 00 00 00 00 00 17 14 00 00 18 0D E6 00 00 E6
F8 D7 E6 FF 80 31 30 E6 F6 1C 2C C0 3C 00 C2 42
43 15 0C 41 74 30 15 6B 03 46 E0 80 03 F7 B0 0B
76 03 04 EB 03 46 0B 40 1C 02 76 15 01 EB 10 1C
08 76 15 02 EB 03 1C 10 76 15 04 EB 02 1C 40 19
F4 E6 F5 03 E6 F1 1B E6 F3 52 8F E6 F3 28 E6 FB
A8 0C 40 1C 00 2C 01 4C 04 38 E2 D2 20 C2 20 56
E2 0F A2 23 EB 0D 30 E2 4A EF A0 E0 A6 E0 44 EB
E4 8B 0F E6 02 01 0C 03 D6 12 AD 0A FB B6 02 03
3B F4 E6 0A 0B E6 0B 01 B0 0E B0 0F 3F E6 02 02
D6 01 7E E6 0D 1E E6 60 0F E4 0D 0C 76 03 02 6B
37 8C 08 D6 0A D0 8B F4 0C 13 3C 04 D6 0A D0 0A
F9 E6 04 FF 31 20 B0 E2 B0 E3 31 20 76 02 01 6B
04 28 E0 38 E1 56 02 FE 0C 0F 1C 3C 56 0B FE D6
12 C4 A6 04 FF 6B 12 76 0B 40 6B 0D 31 30 0C 03
1C 20 D6 12 AD 80 E0 EB F3 E6 60 0F E6 FC 01 E6
0A 03 56 0B 01 B0 1B E6 0D 1E E6 FF 80 56 11 0F
D6 05 18 56 0B FE 31 10 7C 0D B0 E8 B0 E9 B0 EA
E6 13 5E E6 56 01 B0 55 B0 57 B0 58 B0 52 B0 53
E6 54 5F B0 59 B0 5A B0 5B B0 5C E6 5D 08 E6 50
08 E6 51 08 D6 0C 8D 31 40 E6 16 01 D6 03 2E B0
04 B0 05 E6 08 3F E6 03 FF 76 0B 40 ED 06 68 E6
FF 80 E6 06 3F E6 07 FF D8 02 A8 8B FB D6 0B 36
D6 01 79 46 0A 02 8D 12 AD 76 0A 40 EB 3C 56 0A
BF 76 03 20 EB 42 46 03 30 8D 12 3F 46 0A 40 D6
0B 5D 76 0A 04 6B 1E 56 0A FB D6 01 7E 46 0A 20
E4 2C 30 E4 2D 31 E4 2E 32 E4 2F 33 D6 06 84 56
0A DF 46 0A 40 76 0B 04 EB 0E 76 03 20 6B 03 56
03 CF D6 12 AD 46 03 10 AF 46 0A 20 D6 01 7E 31
30 B0 E0 B0 E1 B0 E2 B0 E3 D6 06 84 56 0A DF 31
20 88 E4 38 E5 A8 E6 B8 E7 76 0A 04 6B 08 88 EC
38 ED A8 EE B8 EF AF 6C 17 7C 04 B0 17 B0 18 B0
19 B0 1A D6 16 EB A6 16 29 6B 0D F3 65 6E 7A F3
D6 10 8A A6 16 29 EB F8 31 50 D6 16 EB A6 16 28
6B D5 53 12 D6 12 20 59 14 46 0B 20 AF D6 12 20
08 E4 42 05 EB 11 08 24 18 25 76 0A 04 6B 0C 04
```

```
2C E1 14 2D E0 8B 04 08 E4 18 E5 B0 E2 B0 E3 46
0A 28 46 0B 01 D6 06 84 56 0A D7 56 0B FE 31 20
B0 E0 B0 E1 B0 E2 B0 E3 B0 E4 B0 E5 B0 E6 B0 E7
B0 E8 B0 E9 B0 EA B0 EB 31 30 EC 43 FC 60 DC 50
D6 16 42 B0 50 B0 51 B0 52 B0 53 B0 54 B0 55 B0
56 B0 57 B0 5C B0 5D B0 5E EC 43 FC 60 DC 50 56
0B FB 56 0A FB 8D 16 2E D6 10 8A A6 16 23 EB 08
D6 10 8A A6 18 23 EB F8 D6 16 22 7B 1B 31 30 B0
E0 18 16 56 E1 1F 00 E1 02 11 06 E1 3F 16 E0 1B
C2 20 A0 E0 C2 30 30 E2 A6 16 2D 6B 05 D6 16 16
7B C6 D6 12 37 3D 06 74 D6 10 8A 56 16 0F F0 16
56 11 0F 44 16 11 8D 0B 5D 31 40 0C 1F 1C 4E 5C
13 2C 40 3C 00 59 05 B0 04 C2 40 A0 E0 F0 E4 D2
42 A0 E2 F0 E4 D2 42 A0 E2 5A EE 8D 01 5F 31 40
D6 10 8A 56 16 0F A6 16 04 2B 03 26 16 04 E8 11
56 EE 07 A4 16 EE EB 01 AF A6 16 00 6D 01 C9 46
0B 01 70 0D E6 0D 1E 70 0A D6 01 7E 0C 09 1C CE
76 02 01 6B 08 24 21 E1 34 20 E0 8B 06 24 23 E1
34 22 E0 03 32 19 33 60 E0 60 E1 A0 E0 B0 30 B0
31 D6 06 D1 46 0A 08 B0 30 B0 31 E6 32 01 E6 33
48 E6 0D 2D E6 60 C8 D6 06 D1 48 16 22 4E DB 03
06 E4 04 02 44 00 E4 B0 30 B0 31 E6 33 88 E6 32
FF D6 06 D1 A6 04 FF EB 08 B0 E4 76 03 02 EB 01
4E B0 30 B0 31 E6 32 00 E6 33 78 D6 06 D1 4A D7
B0 30 B0 31 E6 33 B8 E6 32 FE D6 06 D1 56 0A F7
E6 60 0F E4 16 11 B0 30 B0 31 09 32 19 33 E6 0D
1E D6 06 D1 56 0B FE 50 E0 50 0D 76 E0 40 ED 01
8C AF D6 12 20 A6 E5 C9 6B 1A A6 E5 C9 6B 1A A6
E5 CE 6B 1D A6 E5 DE ED 04 DF 56 15 2F 46 15 20
E6 F7 41 AF 56 15 0F 8B F7 56 15 0F 46 15 10 8B
EF 46 15 30 E6 F7 C1 AF D6 16 EB 59 13 AF D6 10
69 D6 16 EB 59 54 8D 0C 8D 31 30 DC 03 D6 12 20
DA FB AF D6 05 18 31 30 0C 40 1C 08 D6 12 20 F3
04 0E F3 05 0E 1A F5 D6 13 93 76 02 01 EB 04 A0
E0 A0 E0 C2 20 A0 E0 C2 30 76 02 01 EB 11 76 4A
80 ED 05 18 24 4F E3 34 4E E2 5D 05 18 8B 0F 76
48 80 5D 05 18 24 4D E3 34 4C E2 5D 05 18 EC 43
FC 20 DC 40 D6 16 2E 08 48 18 49 28 4A 38 4B 46
0A 08 D6 06 84 56 0A F7 E4 40 24 E4 41 25 E4 42
26 E4 43 27 8D 12 F2 D6 10 8A D6 05 18 56 FC FD
56 0A EF A6 16 4D 6B 12 A6 16 4E 6B 08 A6 16 31
6B 03 8D 12 C4 46 FC 02 8B F8 46 0A 10 8B F3 AF
D6 05 18 76 02 01 EB 0D 31 30 0C 0F 1C 23 B0 E2
B0 E3 D6 06 D1 46 02 01 D6 02 5E 8D 12 C4 D6 05
18 76 02 01 6B 0D 31 30 B0 E0 B0 E1 2C 0F 3C 23
D6 06 D1 56 02 FE 8B E0 D6 01 7E 31 30 08 20 18
21 28 22 38 23 60 E0 60 E1 A0 E0 60 E2 60 E3 A0
E2 D6 06 D1 D6 02 5E 8D 12 C4 D6 10 8A A6 16 43
8D 04 B7 A6 16 44 6D 05 FB A6 16 4C 6D 11 6A A6
16 55 6D 03 F2 A6 16 42 6D 04 28 A6 16 54 6D 04
2E A6 16 4D 6D 04 39 A6 16 48 6D 04 E0 A6 16 46
8D 04 FE A6 16 52 ED 04 DF D6 11 28 EC 43 FC 20
DC 40 D6 16 42 31 30 FC 28 D6 15 83 B0 E0 18 11
56 E1 0F 76 03 20 EB 03 46 E1 10 76 0B 04 6B 03
46 E1 20 76 02 01 6B 03 46 E1 40 D6 05 E2 B0 E0
B0 E1 D6 05 E2 6C 2C 08 24 18 25 D6 15 B6 08 26
18 27 D6 15 B6 7C 07 8C 40 E3 08 8E E3 18 8E D6
15 B6 7A F5 6C 29 08 4E 18 4F D6 15 B6 FC 0D 8D
15 83 D6 15 E6 F8 E4 D6 15 7D F8 E5 F0 EF D6 15
7D F8 E5 D6 15 7D FC 2C 8D 15 83 D6 11 6A 31 40
FC 28 D6 15 83 08 24 18 25 6C 2C D6 15 B6 08 26
18 27 6C 29 D6 15 B6 FC 0D 8D 15 83 D6 11 28 31
```

```
40 FC 28 D6 15 83 1C 0D 2C 1F 3C 52 C2 F2 D6 15
83 A0 E2 1A F7 FC 29 D6 15 83 FC 0D 8D 15 83 D6
12 20 0C 5A 76 0A 10 EB 11 A6 E5 01 6B 09 0C 2D
A6 E5 02 6B 02 0C 1E 09 0D AF A6 E5 04 3B F8 0C
2D A6 E5 09 3B F1 8B ED 31 40 0C 1F 1C 73 5C 41
8D 03 01 AF 76 FC 01 EB 62 56 FC FE D6 10 74 76
0A 80 6B EF 56 0A FB 70 FD 31 30 EC 43 FC 12 DC
38 B0 EC 92 CE A0 EE DA FA 48 24 58 25 19 25 09
24 76 0A 20 EB 06 04 29 25 14 28 24 18 25 08 24
22 15 32 04 48 26 58 27 29 26 38 27 76 0A 20 EB
06 04 2B 27 14 2A 26 28 26 38 27 22 35 32 24 8B
45 70 FD 31 30 D6 09 68 50 FD AF 46 FC 01 D6 10
74 76 0A 80 6B 8D 70 FD 31 30 76 0A 04 6B 1B 56
0A FB 04 2D E1 14 2C E0 04 2F E3 14 2E E2 24 25
E1 34 24 E0 24 27 E3 34 26 E2 04 E1 25 14 E0 24
04 E3 27 14 E2 26 76 0A 08 6B 05 D6 09 77 8B 4E
EC 43 FC A0 DC 40 D6 16 2E EC 43 FC E0 DC 50 D6
16 2E EC 43 FC 60 DC 50 D6 16 42 31 40 08 30 18
31 28 32 38 33 48 E0 42 41 EB 26 48 E2 42 43 EB
20 31 30 EC 43 FC A0 DC 40 D6 16 42 EC 43 FC 60
DC 50 D6 16 2E EC 43 FC E0 DC 50 D6 16 42 50 FD
AF 48 E0 58 E1 04 51 E5 14 50 E4 68 E2 78 E3 04
53 E7 14 52 E6 88 E4 98 E5 A8 E6 B8 E7 D6 08 B9
54 5E EE 6B 0C F9 5E 59 51 49 50 79 53 69 52 8B
B0 E8 EF 44 5E EE EB 0F F9 5E 59 55 49 54 79 57
69 56 D6 09 77 8B E0 44 5E 5E EB 71 F9 5E C8 EF
59 51 49 50 79 53 69 52 60 E0 60 E1 A0 E0 60 E2
60 E3 A0 E2 D6 09 31 D6 08 B9 54 5E EE 6B 1C F9
5E 99 51 89 50 B9 53 A9 52 08 54 18 55 22 19 32
08 28 56 38 57 22 3B 32 2A 8B D9 D6 08 EE 44 5E
5E EB D1 08 E8 18 E9 24 55 E1 34 54 E0 28 EA 38
EB 24 57 E3 34 56 E2 99 55 89 54 B9 57 A9 56 D6
09 77 D6 01 81 46 0B 04 C9 5E 8D 07 97 D6 09 31
D6 08 B9 54 5E EE 6B 2D F9 5E 89 50 99 51 A9 52
B9 53 08 E4 18 E5 24 51 E1 34 50 E0 28 E6 38 E7
24 53 E3 34 52 E2 D8 E0 42 D1 EB D1 D8 E2 42 D3
EB CB 8D 07 51 D6 08 EE 44 5E 5E EB C0 08 E8 18
E9 24 55 E1 34 54 E0 28 EA 38 EB 24 57 E3 34 56
E2 99 55 89 54 99 51 89 50 B9 57 A9 56 B9 53 A9
52 D6 01 81 D6 03 77 56 0B FB 76 0A 04 EB 03 D6
01 79 08 E4 18 E5 24 51 E1 34 50 E0 28 E6 38 E7
24 53 E3 34 52 E2 8D 07 45 B0 EF 76 E8 80 6B 03
46 EF 01 76 EA 80 6B 03 46 EF 04 E8 59 D8 58 22
E9 32 D8 76 ED 80 6B 03 46 EF 02 E8 5B D8 5A 22
EB 32 DA 76 ED 80 6B 03 46 EF 08 E8 EF AF 76 5E
01 6B 08 D8 E8 42 D9 EB 37 8B 2F 76 5E 04 6B 08
D8 EA 42 DB EB 2A 8B 22 76 5E 02 6B 0E E8 59 D8
58 22 E9 32 D8 42 DE EB 17 8B 0F 76 5E 08 6B 10
E8 5B D8 5A 22 EB 32 DA 8B EB 42 FF EB 02 B0 5E
AF B0 ED D0 E0 C0 E1 C0 ED 04 5C ED 16 E1 00 16
E0 00 D9 5C B0 ED D0 E2 C0 E3 C0 ED 04 5D ED 16
E3 00 16 E2 00 D9 5D 88 50 98 51 02 91 12 80 A8
52 B8 53 02 B3 12 A2 AF 09 30 19 31 29 32 39 33
70 FD 31 30 8D 0A 29 09 30 19 31 29 32 39 33 70
FD 31 30 D6 16 5C 76 0A 40 ED 0A 29 76 0B 02 ED
0A 29 EC 43 FC 40 DC 50 D6 16 2E 31 50 08 30 18
31 28 32 38 33 48 E0 58 E1 76 E4 80 6B 06 60 E4
60 E5 A0 E4 68 E2 78 E3 76 E6 80 6B 06 60 E6 60
E7 A0 E6 88 E6 98 E7 22 95 32 84 70 FC A8 E4 B8
E5 FB 0D 60 E8 60 E9 A0 E8 D6 0B E9 A8 E6 B8 E7
50 FC 76 32 80 70 FC A9 32 B9 33 31 30 6B 06 60
E2 60 E3 A0 E2 50 FC 70 FC FB 03 D6 0B E9 D6 0A
```

```
2F 31 50 89 32 99 33 31 30 50 FC 70 FC 6B 06 60
E2 60 E3 A0 E2 B0 E0 B0 E1 50 FC FB 03 D6 0B E9
EC 43 FC 40 DC 50 D6 16 42 D6 0A 2F 50 FD AF E6
9C 3C 9C FF 76 E2 80 EB 01 9E C8 E2 D8 E3 02 D1
12 C0 5B 01 9E C8 E2 D8 E3 22 D1 32 C0 5B 01 9E
76 E0 80 EB 08 8C 02 22 89 98 E8 8B 03 06 E9 05
D6 14 B0 C8 E2 D8 E3 02 D1 12 C0 68 EC 42 6D 6B
44 A8 E2 B8 E3 68 E2 78 E3 22 71 32 60 5B 0A 60
E6 60 E7 A0 E6 A8 E0 B8 E1 E8 EA F8 EB 02 F7 12
E6 B0 E0 B0 E1 28 E0 38 E1 02 31 12 20 02 3F 12
2E 5B 13 02 17 12 06 D6 0A C4 D6 0A D0 80 EC 6B
04 80 EC EB E0 AF 02 1B 12 0A D6 0A C4 F0 E8 D6
0A D0 8B ED 2C 1B 3C C3 02 33 16 E2 00 C2 82 AF
76 0A 02 6B FB 56 0A FD D6 0B 6A 76 11 F0 6B 2B
76 0B 02 EB 26 76 0B 04 EB 21 76 0A 08 EB 1C 76
0A 40 6B 17 00 10 EB 13 76 03 20 6B 05 D6 01 BA
8B 03 D6 01 81 D6 0B 41 E6 0C 3C 31 30 42 CC EB
0E A4 60 ED BB 09 A6 0C 3C FB 0B 20 0C 8B 07 A4
0D 0C 3B 02 00 0C E4 0C F2 46 F1 0C AF B0 EE F8
11 F0 EF 56 EF 0F 00 EF 02 FF 06 EF 67 16 EE 1D
AF 70 FD 31 10 D6 0B 2D 76 03 20 6B 02 A0 EE D6
0B 55 50 FD AF C2 DE 56 ED 7F D9 10 AF 70 FD 31
10 D6 0B 2D D6 0B 55 50 FD AF 31 20 76 38 08 6B
04 80 E2 20 0F 76 38 04 6B 04 A0 E2 00 0F 76 38
01 6B 04 A0 E0 20 0E 76 38 02 6B 04 80 E0 00 0E
D6 0B 96 8D 11 58 31 30 56 0E 07 56 0F 07 2C 1B
3C 7F 76 0B 01 EB 09 76 02 01 6B 04 2C 1B 3C 87
04 0E E3 16 E2 00 C2 82 56 E8 F0 2C 1B 3C 7F 66
0B 01 6B 09 76 02 01 6B 04 2C 1B 3C 87 70 FC 04
0F E3 16 E2 00 C2 22 56 E2 0F 42 82 50 FC 6B 02
F0 E8 2C 80 3C 00 92 82 AF F8 30 E4 32 30 F9 32
F8 31 E4 33 31 F9 33 AF 46 0B 02 D6 01 7E 31 30
EC 43 FC 00 DC 50 D6 16 42 31 50 D6 10 8A A6 16
28 6D 0C 98 B0 E5 6C 01 B0 E7 B0 E8 A6 16 31 6B
1A A6 16 33 EB 06 5C FF 68 E5 8B 0F B0 E5 B0 E6
8C 01 A6 16 34 6B 04 7C FF 88 E7 D6 10 8A 08 16
56 E0 0F 18 E0 EC 01 CF 10 EE 1A FB D6 10 8A A6
16 2B EB 06 18 EE D0 E1 02 E1 08 EE 18 EE 31 30
D6 0F 66 31 40 48 24 58 25 68 26 78 27 76 0A 04
58 08 48 2C 58 2D 68 2E 78 2F D6 10 8A 56 16 7F
A4 54 16 6B 05 D6 0C F7 8B F0 56 0B FD 31 30 DC
50 EC 43 FC 00 8D 16 2E D6 10 8A A6 16 29 6B BE
A6 16 53 EB 09 D6 12 20 59 50 59 51 8B EA A6 16
57 EB 05 D6 12 20 8B F2 A6 16 58 EB 09 D6 12 20
49 55 59 56 8B D2 A6 16 59 EB 09 D6 12 20 49 57
59 58 8B C4 A6 16 49 EB 05 E6 53 FF 8B BA A6 16
4E EB 07 B0 53 D6 10 8A 8B AE A6 16 47 EB A9 E4
16 52 56 52 0F 8B A1 31 30 A6 16 0A EB 0E B0 30
B0 31 2C FF 3C F7 46 0A 80 8D 0D C9 56 0A 7F A6
16 0D EB 12 08 44 18 45 28 46 38 47 46 0A 20 D6
06 84 56 0A DF AF A6 16 08 EB 0C 0C FF 1C FA B0
33 B0 32 D6 0D C9 AF A6 16 20 7B FA A6 16 7F BB
F5 31 40 B0 EE F8 16 26 EF 20 02 FF 06 EF 70 16
EE 1C C2 0E A0 EE C2 1E 2C 10 3C 00 D6 0D 9D 3C
04 B0 EF 76 EF 02 EB 07 C2 20 A6 E2 FF EB 07 D6
01 7E 2C 54 8B 27 76 E2 80 6B 08 D6 01 8C 56 EF
FE 8B 10 76 EF 01 6B 05 46 EF 02 8B EE D6 01 7E
46 EF 01 56 E2 7F D6 0D 9D A0 E0 8B C6 31 40 E8
E2 D6 0E 98 E9 31 B0 30 E8 E3 D6 0E 98 24 EE 31
36 30 00 E8 E2 56 EE 0F E9 33 B0 32 E8 E3 56 EE
0F 24 EE 33 36 32 00 38 E2 31 30 68 51 48 30 58
31 B0 30 B0 31 04 E5 31 14 E4 30 6A F8 68 50 48
```

```
32 58 33 B0 32 B0 33 04 E5 33 14 E4 32 6A F8 D6
10 03 70 E0 70 E1 70 E2 70 E3 70 E2 70 E3 28 48
38 49 D6 14 6D 08 4A D6 0E A4 A8 E5 98 E4 88 E3
78 E2 50 E1 50 E0 28 4B 38 4C D6 14 6D 08 4D D6
0E A4 22 A5 32 94 32 83 32 72 04 5A EA 14 59 E9
16 E8 00 16 E7 00 99 59 A9 5A 50 E1 50 E0 28 48
38 49 D6 14 6D 08 4A D6 0E A4 F8 E5 E8 E4 C8 E3
B8 E2 50 E1 50 E0 28 4B 38 4C D6 14 6D 08 4D D6
0E A4 02 5F 12 4E 12 3C 12 2B 04 5C E5 14 5B E1
16 E3 00 16 E2 00 49 5B 59 5C 08 E7 18 E8 76 0A
80 6B 0F 04 E1 45 14 E0 44 04 E3 47 14 E2 46 56
0A 7F D6 06 E6 31 40 AF D0 EE D0 EE D0 EE D0 EE
56 EE 0F AF 42 00 6B 0D 5B 0C CF 10 E5 10 E4 10
E3 10 E2 0A F5 AF 60 E0 0E D0 E2 C0 E3 C0 E4 C0
E5 0A F6 AF D6 10 8A A6 16 29 6B 38 A6 16 53 EB
F3 D6 12 20 59 5D 8B EC D6 10 69 31 50 46 0B C2
D6 10 8A A6 16 28 6B DC E8 16 56 EE 0F F8 EE DC
01 CF 10 ED FA FB D6 10 8A A6 16 2B EB 09 F8 ED
D0 EF 02 DF D6 10 8A D6 0C 8D 70 0A D6 01 7E 31
40 8C 7F 9C FE AC 01 B0 EB B0 EC DC 01 31 50 B0
E3 08 ED 18 ED 31 40 E6 30 FF E6 31 FD E6 32 FF
E6 33 FE D6 0D C9 31 40 B0 EE F8 16 56 EF 0F 02
FF 06 EF 5B 16 EE 1C D6 0D 52 E6 30 FF E6 31 FD
B0 32 E6 33 02 D6 0D C9 56 0B FD 50 E0 76 E0 40
ED 01 8C 8D 01 7E 31 30 08 55 18 56 D6 14 59 29
40 39 41 49 42 59 43 08 57 18 58 D6 14 59 29 44
39 45 49 46 59 47 31 40 88 E0 98 E1 A8 E2 B8 E3
02 B7 12 A6 12 95 12 84 76 E8 40 EB 1D CF 10 EB
10 EA 10 E9 10 E8 CF 10 E3 10 E2 10 E1 10 E0 CF
10 E7 10 E6 10 E5 10 E4 8B DE D6 10 5A 31 30 D6
10 1E 70 E4 59 5E F9 5F D6 10 5A 31 30 08 E4 18
E5 28 E6 38 E7 D6 10 1E 49 4B 59 4C F9 4D 50 49
E4 5E 49 E4 5F 4A 31 40 76 55 80 6B 06 60 E8 60
E9 A0 E8 76 57 80 6B 0A 60 EB 60 EC 06 EC 01 15
EB 00 AF 76 0A 80 EB 15 44 53 53 6B 10 48 E2 50
E3 D0 E4 C0 E5 D0 E4 C0 E5 02 15 12 04 AF 48 E3
58 E3 D6 14 C7 FC 08 B0 E4 B0 E5 A8 E6 42 A7 6D
1D A8 E4 56 EA F0 EB 16 CF 10 E7 10 E6 10 E5 10
E4 CF 10 E7 10 E6 10 E5 10 E4 00 EF 8B E3 08 E4
18 E5 28 E6 38 E7 D6 15 2E AF CC 30 DC 40 EC 0C
E3 FD F3 CF CE DE EA F8 AF 31 30 DC 50 EC 43 FC
00 8D 16 42 D6 12 20 76 0A 80 6B 0D 31 30 08 E4
18 E5 D6 12 20 28 E4 38 E5 AF 70 FD 31 30 B0 EE
B0 EF 46 0A 02 76 0B 20 EB 0E 8F A6 05 0A FB 08
76 0A 01 6B 03 D6 11 3D 9F D6 11 58 76 0B 20 6B
12 76 0B 40 6B 0D A6 04 00 BB 1B A6 05 5A BB 16
D6 11 0D 88 05 44 04 E8 EB 0C 80 EE EB DA D6 13
B7 56 0A FD 8B D2 31 00 80 E4 A0 E6 C2 C6 A0 E6
56 EC 0F F0 EC 70 EC C2 C6 56 EC 0F 50 16 44 EC
16 A6 E6 42 EB 09 A6 E7 BF 7B 04 6C 3F 7C FF 76
0A 02 EB 06 D6 01 6D 46 0A 02 50 FD AF D6 11 28
F8 17 D6 15 83 F8 18 D6 15 83 F8 19 D6 15 83 F8
1A D6 15 83 56 0B BF AF 76 0B 20 6B 0D 31 10 F8
14 42 FF 6B 05 D6 12 BB FA FB 31 30 AF 56 03 BF
76 15 20 EB 0A 76 15 10 EB 05 E6 F0 11 8B 03 E6
F0 91 56 0A FE 8D 15 AD 76 02 08 ED 11 EA 56 02
FD D6 12 AD 76 02 08 ED 11 EA 70 02 70 E8 D6 13
B7 8C 01 76 02 08 6B FB D6 12 AD 00 E8 EB 05 B6
02 02 8C 07 76 02 08 6B 52 76 03 04 EB 12 D6 12
4D 76 03 04 EB 0A 50 E8 50 02 D6 01 6D 8D 02 F9
76 03 08 EB 10 D6 12 AD 76 03 08 EB 08 B6 02 01
76 03 08 6B FB 76 02 04 EB BE D6 12 AD 76 02 04
```

```
EB B6 76 02 04 6B FB 76 02 01 50 E8 50 02 70 FC
D6 01 6D 50 FC 6D 00 CA 8D 11 EE D6 12 AD 76 02
08 6B F8 50 E8 50 02 D6 01 6D 46 02 02 AF D6 01
7E 46 0B 01 31 30 0C F8 1C C3 28 22 38 23 76 02
01 6B 04 28 20 38 21 60 E2 60 E3 A0 E2 D6 06 D1

31 20 0C F8 1C F8 B0 E2 B0 E3 46 02 01 8D 00 E2
56 0A 7F D6 10 8A D6 16 16 FB 14 A6 16 28 6B 54
D6 16 22 FB 4F A6 16 2D EB E9 46 0A 80 8B E4 31
30 B0 E4 B0 E5 56 16 0F 04 16 E5 16 E4 00 D6 10
8A D6 16 16 FB 05 D6 12 87 8B 1A 78 E5 68 E4 02
77 12 66 02 55 12 44 02 55 12 44 02 55 12 44 02
57 12 46 8B D0 76 0A 80 6B 06 60 E4 60 E5 A0 E4
46 0A 80 AF 56 0A 7F 70 FD 31 00 8F A0 E4 9F A6
E6 3F EB 04 6C 42 7C BF 80 E6 80 E6 50 FD AF 70
FD 31 10 FC 02 D6 12 BB FA FB 50 FD AF 70 FD 31
10 FC 06 D6 12 BB FA FB 50 FD AF EC 0B DC C8 DA
FE EA FA AF 31 40 D6 13 93 2C 44 3C 04 C3 20 3A
FC B0 E0 B0 E1 B0 E2 B0 E8 B0 E9 B0 EA B0 EB C8
E4 D8 E5 E8 E6 F8 E7 31 30 EC 43 FC 20 DC 40 D6
16 2E 31 30 EC 43 FC 20 DC 40 D6 16 42 EC 43 FC
60 DC 50 D6 16 42 31 50 88 44 98 45 24 41 E9 34
40 E8 A8 46 B8 47 24 43 EB 34 42 EA 31 30 EC 43
FC 60 DC 50 D6 16 2E 31 40 22 51 32 40 5B 61 70
E4 42 45 50 E4 6B 59 22 73 32 62 5B 53 70 E6 42
67 50 E6 6B 4B 22 D9 32 C8 5B 45 70 EC 42 CD 50
EC 6B 3D 22 FB 32 EA 5B 37 70 EE 42 EF 50 EE 6B
2F 08 E4 48 EE E8 E0 08 E5 58 EF F8 E0 31 30 FC
4C EC 40 D6 13 CB FC 44 EC 48 D6 13 CB B0 43 B0
44 B0 4B B0 4C 31 30 EC 43 FC 80 DC 40 8D 16 2E
8D 05 18 0C 1F 1C 61 76 0A 10 EB 11 06 E1 06 16
E0 00 76 FC 02 6B 06 06 E1 06 16 E0 00 76 02 01
6B 04 A0 E0 A0 E0 AF 70 EF 70 EE EC 80 FC 00 B0
E8 92 8E 46 03 30 50 EE 50 EF AF 70 EE E3 0F FE
E3 1F FE 76 0A 10 6B 1A 2C 7D 3C FC D6 14 6D CF
10 E5 10 E4 10 E3 10 E2 08 E2 18 E3 28 E4 38 E5
8B 21 B0 E2 B0 E3 48 E0 58 E1 D0 E0 C0 E1 C0 E2
C0 E3 D0 E0 C0 E1 C0 E2 C0 E3 76 FC 02 EB 04 02
15 12 04 B0 EE D8 E0 56 ED E0 EB 12 76 E0 10 EB
18 00 EE CF 10 E3 10 E2 10 E1 10 E0 8B EE EE D0
E0 C0 E1 C0 E2 C0 E3 8B DC E3 4F FE E3 5F 76 E4
40 EB 08 CF 10 E5 10 E4 EE 8B F3 D6 14 C7 50 ED
F3 D6 DE F3 D7 DE F3 DE AF 28 E0 38 E1 8B 0E DC
30 C3 D0 C3 D0 E5 E2 32 2E E5 E2 33 2E 70 FD 31
30 68 E0 B2 62 D6 14 B0 B0 E5 B0 E4 DC 10 CF 8B
04 02 55 12 44 12 33 12 22 FB 08 02 51 12 40 FB
02 A0 E2 DA EC 76 E6 80 6B 13 60 E2 60 E3 60 E4
60 E5 B0 E6 06 E5 01 12 46 12 36 12 26 50 FD AF
76 E0 80 6B 06 60 E0 60 E1 A0 E0 76 E2 80 6B 06
60 E2 60 E3 A0 E2 AF B8 E0 B2 B4 76 E4 80 6B 06
60 E4 60 E5 A0 E4 76 E0 80 6B 13 60 E0 60 E1 60
E2 60 E3 B0 EA 06 E3 01 12 2A 12 1A 12 0A B0 E6
B0 E7 B0 E8 B0 E9 AC 10 CF 10 E3 10 E2 10 E1 10
E0 CF 10 E9 10 E8 10 E7 10 E6 C8 E0 D8 E1 22 D5
32 C4 7B 06 08 EC 18 ED A0 E6 AA DC 76 EB 80 6B
0C 60 E6 60 E7 A0 E6 60 E8 60 E9 A0 E8 AF B0 E4
B0 E5 B0 E6 B0 E7 B0 E8 B0 E9 AC 10 CF 10 E3 10
E2 10 E1 10 E0 10 E7 10 E6 CF 10 E3 10 E2 10 E1
10 E0 10 E7 10 E6 CF 10 E5 10 E4 88 E4 98 E5 CF
10 E9 10 E8 B8 E7 C8 E6 22 B9 32 C8 7B 0C 42 BC
8B 08 A0 E4 A0 E8 22 79 32 68 AA C0 AF 56 EF 0F
46 EF 30 42 FF 6B 2E 76 15 10 6B 17 76 15 20 EB
```

```
1A B0 ED EC 08 90 EF FB 01 DE EA F9 76 ED 01 6B
0A 8B 05 76 15 20 6B 03 46 EF 80 F3 F0 76 FA 10
6B FB 56 FA EF AF D6 15 E6 FC 20 76 E3 F0 6B 02
FC 2D D6 15 83 F8 E3 D6 15 7D F8 E4 F0 EF D6 15
7D F8 E4 D6 15 7D F8 E5 F0 EF D6 15 7D F8 E5 D6
15 7D F8 E6 8B 9D 2C 10 B0 E3 B0 E4 B0 E5 76 E0
80 70 FC 6B 06 60 E0 60 E1 A0 E0 CF 10 E1 10 E0
12 55 40 E5 12 44 40 E4 12 33 40 E3 2A ED 50 FC
6B 03 46 E3 F0 AF A6 16 30 7B 05 A6 16 39 3B 0C
DF AF A6 16 41 7B F9 A6 16 5A BB F4 CF AF CC 10
E3 BD DE F0 EB D2 BE A0 EE F0 EB D2 BE A0 EE CA
EF AF CC 10 C2 AE A0 EE 56 EA 0F F0 EA C2 BE A0
EE 56 EB 0F 42 BA F3 DB DE CA E9 AF 31 30 EC 43
FC C0 DC 40 D6 16 2E EC 43 FC 80 DC 40 D6 16 42
70 E2 70 E3 FC 40 D6 16 9D 50 E1 50 E0 70 E2 70
E3 FC 48 D6 16 9D 50 E1 50 E0 EC 43 FC 80 DC 40
D6 16 2E EC 43 FC C0 DC 40 D6 16 42 AF E3 2F FE
E3 3F FE D6 14 6D E3 0F FE 42 00 6B 1C 5B 0D CF
10 E5 10 E4 10 E3 10 E2 0A F5 8B 0D 60 E0 0E D0
E2 C0 E3 C0 E4 C0 E5 0A F6 E3 6F FE E3 7F 02 57
12 46 16 E3 00 16 E2 00 F3 F5 00 EF F3 F4 AF A6
16 3A 7B 03 26 16 07 56 16 0F AF D6 10 8A A6 16
20 6B F8 A6 16 29 6B 1B A6 16 28 6B 16 D6 16 DF
58 16 02 55 02 55 02 55 02 55 D6 10 8A D6 16 DF
04 16 E5 AF 70 FD 31 00 70 EF F8 F0 56 EF 7F 76
0B 08 EB 21 A6 EF 3B EB 06 46 0B 10 8D 18 08 A6
EF 3A 6B 06 56 0B EF 8D 18 08 76 0B 10 6D 18 08
46 0B 08 8B EF 76 1B 01 EB 27 A6 EF 53 EB 0A 76
1B 02 EB 6E 46 1B 01 8B 69 56 1B FD A6 EF 43 EB
05 46 1B 02 8B 5C A6 EF 40 EB 3A 56 0B F7 8D 18
08 70 ED 70 EE 70 EF EC 43 FC 08 82 DE 56 ED 0F
F0 ED A0 EE 82 EE 56 EE 0F 42 ED 50 EF A2 FE 50
EE 50 ED EB 05 56 1B FE 8B 28 A4 13 EF EB 06 46
0B 80 8D 18 08 76 0B 20 6B 18 A4 12 EF EB 13 76
1B 01 6B 05 76 0B 80 6B 09 46 0B 40 56 0B 7F 8D
18 08 F0 EF A0 E8 D2 F8 A0 E8 F0 EF D2 F8 A6 E8
42 EB 09 A6 E9 BF EB 04 8C 3F 9C FF A0 E4 76 0B
20 EB 25 A6 E5 F0 7B 20 76 0A 01 EB 1B 76 15 10
EB 0A 76 15 20 EB 05 E6 F0 13 8B 03 E6 F0 93 46
03 40 46 0A 01 D6 15 AD 50 EF 50 FD BF 46 0A 02
BF D6 10 74 31 40 08 28 18 29 88 2A 98 2B 76 FC
01 6B 15 08 24 18 25 88 26 98 27 76 0A 04 6B 08
08 2C 18 2D 88 2E 98 2F 56 0A FB 04 31 E1 14 30
E0 04 33 E9 14 32 E8 09 2C 19 2D 89 2E 99 2F 28
E0 38 E1 48 E0 58 E1 68 E0 78 E1 A8 E8 B8 E9 C8
E8 D8 E9 E8 E8 F8 E9 D6 10 74 31 40 04 31 E3 14
30 E2 24 31 E7 34 30 E6 04 33 EB 14 32 EA 24 33
EF 34 32 EE D6 10 74 31 40 04 31 E5 14 30 E4 24
31 E1 34 30 E0 04 33 ED 14 32 EC 24 33 E9 34 32
E8 39 31 29 30 B9 33 A9 32 70 0A 46 0A 20 D6 01
7E D6 06 84 D6 01 8C D6 1A DF D6 1A DF D6 1A DF
D6 1A DF 50 E0 8D 1A 31 31 40 58 25 48 24 08 24
18 25 88 26 98 27 C8 26 D8 27 D6 1B 56 28 30 38
31 A8 32 B8 33 29 30 39 31 A9 32 B9 33 46 0A 20
70 0A D6 01 7E D6 06 84 D6 01 8C 31 40 48 E2 58
E3 C8 EA D8 EB D6 1B 56 48 30 58 31 C8 32 D8 33
D6 1B 56 76 0A 80 6B 0D 68 30 78 31 E8 32 F8 33
D6 1A DF 8B EB D6 10 8A D6 10 8A 50 E0 D6 1A 91
56 0A FB AF D6 10 8A A6 16 45 6D 18 11 A6 16 47
6B 86 A6 16 53 6B 81 A6 16 43 70 FC 46 0A 20 D6
10 74 31 40 18 31 08 30 88 32 38 33 48 28 58 29
58 2A 78 2B 76 FC 01 6B 15 48 24 58 25 68 26 78
```

```
27 76 0A 04 6B 08 48 2C 58 2D 68 2E 78 2F 56 0A
FB 31 20 C8 E4 D8 E5 E8 E6 F8 E7 31 40 02 15 12
04 02 97 12 86 D6 12 20 31 40 50 FC 70 FC 70 0A
EB 22 09 2C 19 2D 89 2E 99 2F 09 30 19 31 04 35
31 14 34 30 89 32 99 33 D6 01 7E D6 06 84 E6 34
01 E6 35 68 E4 34 58 E4 35 59 D6 01 8C 31 40 28
24 38 25 22 31 32 20 A8 26 B8 27 22 B9 32 A8 48
E0 58 E1 22 5B 32 4A C8 E8 D8 E9 02 D3 12 C2 68
E0 78 E1 22 73 32 62 E8 E8 F8 E9 22 FB 32 EA 02
1B 12 0A 22 93 32 82 28 24 38 25 A8 26 B8 27 76
58 80 6B 20 09 54 19 55 08 E4 18 E5 48 54 58 55
89 54 99 55 88 EC 98 ED C8 54 D8 55 31 50 60 E8
60 E9 A0 E8 31 50 26 E9 5A 36 E8 00 7B 05 D6 1A
DF 8B F1 06 E9 5A 16 E8 00 3C 12 0C 1B 1C CB 26
E9 05 7B 05 D6 1B 0B 3A F6 06 E9 05 6B 2D 2C 40
D6 1B 28 C8 24 D8 25 D6 1A A0 C9 3E D9 3F 26 E1
08 36 E0 00 D6 1B 28 C8 26 D8 27 D6 1A A0 C9 32
D9 33 E4 3F 31 E4 3E 30 D6 06 E6 50 E0 50 FC 6B
05 76 E0 40 EB 03 D6 01 7E 56 0A DF 46 0A 04 AF
22 6D 32 5C D8 E6 C8 E5 88 E9 A6 E8 01 6B 08 00
E8 02 6D 12 5C 8A FA B0 EC B0 ED B0 EE FC 01 76
E5 80 6B 0C 60 E5 60 E6 02 6F 12 5E 60 EE F8 EE
26 E6 05 36 E5 00 DB 01 AF 02 DF 12 CE 8B F1 31
50 3C 12 0C 1B 1C CB D6 1B 0B 3A FB 48 40 58 41
B8 48 C8 49 6C 40 7C 42 3C 0E E3 A7 F3 6A 6E 7E
3A F8 43 46 59 47 B9 4E C9 4F AF 2C 40 D6 1B 28
B8 E5 C8 E6 26 E1 08 36 E0 00 D6 1B 28 59 32 69
33 C9 31 B9 30 8D 06 84 B0 E4 B0 E5 B0 E6 B0 E7
AC 04 D6 14 5F 04 35 E7 14 34 E6 14 33 E5 14 32
E4 AA EF AC 04 D0 E4 C0 E5 C0 E6 AA F8 FB 06 06
E6 01 16 E5 00 AF D6 10 74 31 40 76 0A 80 6B 11
76 FC 01 6B 0D 04 E5 31 14 E4 30 04 ED 33 14 EC
32 AF 04 29 31 14 28 30 04 2B 33 14 2A 32 AF 31
29 68 4C C4 86 92 13 33 22 66 44 CC 88 99 11 06
79 01 C8 19 34 01 8C 05 3A 02 2D 01 C8 01 C9 02
18 01 C8 01 C8 02 E8 0E D8 01 C8 01 DF 03 1E 06
1C 06 DB 0B F8 02 F9 01 7E 06 3F 04 43 01 C8 01
C8 00 E2 45 15 19 89 8A 2A 26 46 FF 5D 0F E9 00
C2 FF F8 FE DA 0F A3 01 A1 FF E1 FE 77 0F 31 02
9B FF BC FE 33 0E 95 03 AC FF 8C FE 0C 0D D2 04
CF FF 52 FE 00 0C EE 06 00 FF 12 FE 0B 0B EC 07
38 FE D1 FE 2A 0A D3 08 73 FE 91 FE 58 09 A8 09
A8 FE 58 FE 91 08 73 0A D3 FE 2A FE D1 07 38 0B
EC FE 0B FF 12 06 00 0C EE FE 00 FF 52 04 CF 0D
D2 FE 0C FF 8C 03 AC 0E 95 FE 33 FF BC 02 9B 0F
31 FE 77 FF E1 01 A1 0F A3 FE DA FF F8 00 C2 0F
E9 FF 5D 00 00 00 00 10 00 00 00 1D D4 1F 22 1C
67 1E 97 1C 6C 1F 1E C4 C8 88 84 FF C4 A8 84 FF
1D 44 1F 3C 1D AA 1D 45 1D 2E 1D 3A 1D 53 1E 80
1D 61 1D 66 1D 6B 1D 6F 1D 73 1D 71 1D 75 1E AF
1E A6 1D 7B 1D 81 1D 89 1D 9B 1D A0 1D AD 1D B8
1E 49 1D BC 1D CA 1D C7 1D D8 1D 49 1D DC 1E 82
1D E0 1D 4D 1D F0 1E 04 1E 0B 1E 16 1E 18 1E 01
1F 11 1E 76 1E A0 1E 12 1E 1D 1E 21 1E 26 1E 2C
1E 42 1E 2A 1E 3F 1E 4F 1F 39 1E 5C 1E 63 1E 6D
1E 73 1E 36 1F 1B 1E 7B 1E 1C 1E 88 1D 44 1F 0B
1E 81 1E 8D 1E 67 1F 24 1E B0 1E B8 1E 3A 1E C2
1E CD 1F 3F 1E FC 1E D3 1D 97 1E D8 1E E1 1E 97
1E E8 1E C5 1E EF 1E F4 1F 01 1F 05 1F 0D 1F 15
1F 22 1F 2B 1F 34 1D FC 1D 38 1F 43 1F 49 05 B5
C6 C7 B8 98 89 9A BA CA 2B 24 CB 8B 89 A9 AB 24
A6 C6 C4 A4 FF 19 95 39 B5 08 C8 06 46 8A 9B BB
```

```
CA C4 07 47 B6 B5 A4 94 85 87 A9 AA 9B 8A 89 C4
FF 3B AA A5 B4 FF 1B AA A5 94 FF 49 85 09 C5 29
A5 07 47 13 A4 24 94 95 A5 A4 FF 14 B4 24 AB 9A
FF 0A 9B BB CA C8 84 C4 FF 05 94 B4 C5 C7 B8 98
B8 C9 CA BB 9B 8A FF 1B AA A4 FF 34 BB 86 C6 FF
05 94 B4 C5 C7 B8 88 8B CB FF 1B 99 39 3B 9B 8A
85 94 B4 C5 C7 B8 88 FF 14 CB 8B FF 14 B4 C5 CA
BB 9B 8A 88 97 C7 FF 03 94 04 85 95 94 84 07 88
98 97 87 FF 28 A4 06 46 35 97 B9 FF 25 C7 A9 FF
35 95 86 89 9A BA C9 C7 B6 B9 A9 98 97 A6 B6 FF
8B BB CA C9 B8 88 B8 C7 C5 B4 84 FF 3A A9 A5 B4
17 27 C7 C4 44 94 85 8A 9B CB FF 8B BB CA C5 B4
84 FF 8B 08 CB 08 44 84 8B CB 08 38 44 0B 84 C4
FF 8B A7 CB C4 FF 8B C4 CB FF 26 C4 05 94 B4 C5
CA BB 9B 8A 85 FF 24 A8 8B 28 4B AB 9A 94 08 28
C4 04 8B BB CA C9 B8 88 FF 4A C9 B8 18 87 85 05
94 B4 C5 C7 B8 98 89 8A 9B BB CA FF 0B 85 94 B4
C5 CB FF 0B A4 CB FF B4 C5 C7 B8 88 04 0B 94 A8
B4 CB FF CB 0B 44 14 B4 24 AB 1B 3B AB A4 B4 FF
2B 29 0B AB BA 98 96 15 14 A4 AB 9B FF 18 B8 C7
C4 94 85 86 97 C7 FF 05 94 B4 C5 C7 B8 98 87 07
05 94 B4 C5 CB FF 05 94 B4 C5 CA BB 9B 8A 85 04
4B C4 94 85 87 98 C8 FF 06 C6 C7 B8 98 87 85 94
C4 FF 11 B1 C2 42 C8 98 87 85 94 C4 FF 8B 08 B8
C7 C4 FF 8B 06 C8 06 44 88 07 98 A7 B8 C7 C4 27
24 88 07 98 B8 C7 C4 FF B4 C5 C7 B8 88 82 FF 88
06 98 C8 FF B4 C5 B6 96 87 98 C8 FF 02 92 A3 A8
29 2A A5 B4 48 08 85 94 B4 C5 C8 C4 FF 08 A4 C8
FF 8B 4B C4 48 08 94 A6 B4 C8 FF CB 8B 04 44 84
C8 08 C8 08 44 94 85 87 98 C8 FF 12 B2 C3 C8 08
85 94 C4 FF 08 C8 84 C4 FF 0B CB 24 2B A6 25 24
A8 29 2A 1A A9 A5 94 27 37 07 98 B6 C7 FF 53 31
34 20 50 43 36 39 35 20 30 39 39 30 78 30 31 5F
5A 0F 61 09 6D 06 F2 0C 1C 07 6C 05 78 3C 8C 25
1C 1B 58 50 31 41 44 31 39 30 30 2C 31 34 30 30
55 50 32 31 39 30 30 2C 30 44 30 2C 31 34 30 30
55 50 33 30 2C 30 44 31 39 30 30 2C 30 2C 31 39
30 30 2C 31 34 30 30 50 34 30 2C 31 34 30 30 2C
30 2C 30 5A FF FF FF FF FF FF FF FF FF FF FF FF
FF FF FF FF FF FF FF FF FF FF FF FF FF FF FF FF
FF FF FF FF FF FF FF FF FF FF FF FF FF FF FF FF
FF FF FF FF FF FF FF FF FF FF FF FF FF FF FF FF
FF FF FF FF FF FF FF FF FF FF FF FF FF FF FF FF
```

The foregoing description of the invention has been directed to a particular preferred embodiment for purposes of explanation and illustration. It would be apparent, however, to those skilled in this art that many modifications and changes in the apparatus may be made without departing from the scope and essence of the invention. It is the intention in the following claims to cover all equivalent modifications and variations as fall within the scope of the invention.

What is claimed is:

1. A plotter instrument for marking on a recording medium, comprising:

a pen carousel for carrying a plurality of marking pen elements;

said pen carousel being rotatable to permit placement of a marking pen element in position for marking on the recording medium;

a cam track;

a cam follower on said pen carousel for engaging said cam track; and a carriage for driving said pen carousel to cause engagement of the cam follower with the cam track, thereby rotating the pen carousel and resulting in a change of the marking pen element in position for marking on the recording medium.

2. The plotter instrument of claim 1, wherein said cam track comprises a concave portion and an adjacent convex portion.

3. The plotter instrument of claim 2, wherein operation of said carriage is bidirectional, and wherein said cam follower first engages the concave cam track portion as the carriage is driven in one direction to partially rotate the pen carousel and then engages the convex cam track portion to complete rotation of the pen carousel as the carriage is driven in the opposite direction.

4. The plotter instrument of claim 1, wherein said pen carousel carries a plurality of cam followers spaced apart about the axis of carousel rotation.

5. The plotter instrument of claim 1, further comprising indicia carried on said carousel for providing a position reference.

6. The plotter of claim 5, further comprising means for sensing said indicia and providing a signal indicative thereof.

7. The plotter of claim 6, wherein said indicia comprises a light reflective surface, and wherein said sensing means includes a light source and an optical sensor.

8. A plotter instrument, comprising:
 a platen defining a supporting surface for a sheet recording medium;
 a traveling carriage bidirectionally movable across the platen;
 a pen carousel for carrying a plurality of marking pen elements;
 said pen carousel being mounted on said carriage for travel therewith, and being rotatable to permit placement of a pen element in position for marking on the recording medium;
 a cam track disposed along the line of carriage travel;
 said cam track including an upwardly arcing concave track surface and an adjacent convex track surface; and
 a plurality of cam followers on said pen carousel spaced apart about the axis of carousel rotation,
 each of said cam followers for initially engaging the concave cam track surface as the carriage is driven in one direction to begin rotation of the pen carousel and then engaging the convex cam track surface as the carriage is driven in the opposite direction, to complete rotation of the pen carousel and result in a change of the marking pen element in position for marking on the recording medium.

9. The plotter instrument of claim 8 wherein said carriage includes a detent mechanism to maintain said carousel in position between cam actuated rotations.

10. The plotter instrument of claim 8 wherein said cam track further includes a beveled surface at the entry to said upwardly arcing concave track surface for axially displacing said pen carousel to release said detent mechanism and permit rotation of the carousel.

11. A plotter instrument for marking on a recording medium, comprising:
 a platen defining a supporting surface for a sheet recording medium;
 a guide extending across said platen;
 a traveling carriage bidirectionally movable on said guide;
 a pen carousel for carrying a plurality of marking pen elements;
 said pen carousel being mounted on said carriage for travel therewith, and being rotatable to permit placement of any one of the pen elements in position for marking on the recording medium; and
 means for causing rotation of said pen carousel to place a different pen element in position for marking on the recording medium.

12. The plotter instrument of claim 11, further comprising end plates for resting on a supporting surface, and wherein said pen carousel comprises a truncated conical structure having its centerline axis substantially parallel to the supporting surface.

13. The plotter instrument of claim 11, wherein said pen carousel carries four marking pen elements.

14. The plotter instrument of claim 11, wherein said carriage freely pivots on said guide, whereby the pen element in position for marking is held against the recording medium by gravity force.

15. A plotter instrument for marking on a recording medium, comprising:
 first and second opposing end plates, each of said end plates having a substantially rectangular opening therein;
 a driven first shaft extending between said end plates in fixed position and having a pair of drive rollers thereon;
 a second shaft extending between said end plates and having a pair of pinch rollers thereon;
 said drive rollers and pinch rollers being engageable with the recording medium for providing displacement thereof; and
 a pinch roller shaft cap eccentrically placed on each end of said second shaft,
 each shaft cap being of a multi-sided, regular polygon configuration and insertable in a respective end plate opening with the orientation at which the cap is inserted determining the spaced relationship between the drive rollers and the pinch rollers, thereby establishing the pressure of engagement between said rollers.

16. The plotter instrument of claim 15 wherein said shaft cap is a 10 sided polygon.

* * * * *